(12) United States Patent
Heo et al.

(10) Patent No.: US 11,337,240 B2
(45) Date of Patent: May 17, 2022

(54) COMMUNICATION NETWORK APPARATUS FOR UPLINK SCHEDULING

(71) Applicant: APPLE INC., Cupertino, CA (US)

(72) Inventors: Youn Hyoung Heo, Seoul (KR);
Bharat Shrestha, Hillsboro, OR (US);
Yujian Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 139 days.

(21) Appl. No.: 16/650,518

(22) PCT Filed: Sep. 28, 2018

(86) PCT No.: PCT/KR2018/011588
§ 371 (c)(1),
(2) Date: Mar. 25, 2020

(87) PCT Pub. No.: WO2019/066587
PCT Pub. Date: Apr. 4, 2019

(65) Prior Publication Data
US 2020/0288494 A1 Sep. 10, 2020

Related U.S. Application Data

(60) Provisional application No. 62/564,870, filed on Sep. 28, 2017.

(51) Int. Cl.
*H04L 12/28* (2006.01)
*H04W 72/12* (2009.01)

(52) U.S. Cl.
CPC ... *H04W 72/1284* (2013.01); *H04W 72/1289* (2013.01)

(58) Field of Classification Search
CPC ....................................................... H04L 12/28
(Continued)

(56) References Cited

U.S. PATENT DOCUMENTS

2021/0266953 A1* 8/2021 Pelletier ................ H04W 72/14

FOREIGN PATENT DOCUMENTS

| EP | 3684023 A1 | 7/2020 |
| WO | 2017136995 A1 | 8/2017 |

OTHER PUBLICATIONS

RAN WGI, 'LS on Bandwidth Part Operation in NR', RI-1711998, 3GPP TSG-RAN WG 1 NR Ad-Hoc#2, Qingdao, P.R. China, Aug. 12, 2017.
(Continued)

*Primary Examiner* — Dang T Ton
(74) *Attorney, Agent, or Firm* — Stoel Rives LLP

(57) ABSTRACT

An apparatus to be used in a UE in a mobile communication network to communicate with a base station, includes a memory configured to store a RRC message, and processing circuitry configured to decode the RRC message to obtain BWP configuration information and mapping information, identify one or more UL BWPs and one or more DL BWPs within a carrier bandwidth per Serving Cell based on the BWP configuration information, identify one or more SR configurations which a LCH is mapped to for the UL BWPs based on the mapping information, the LCH being mapped to none or one SR configuration for each of the UL BWPs, identify activation of a UL BWP of the UL BWPs, and encode an SR on a PUCCH based on a SR configuration for the UL BWP.

21 Claims, 15 Drawing Sheets

(58) Field of Classification Search
USPC .......................................................... 370/329
See application file for complete search history.

(56) References Cited

OTHER PUBLICATIONS

Huawei et al., 'Details on multiple SR configurations', R2-1708265, 3GPP TSG-RAN2 Meeting #99, Berl in, Germany, Aug. 11, 2017.
Zte, 'Consideration on th e SR in NR', R2-1708146, 3GPP TSG-RAN WG2 #99, Berlin, Germany, Aug. 11, 2017.
Huawei et al., 'Scheduling and resource allocation mech anism for active band width part s', RI-1709974, 3GPP TSG-RAN WGI NR Ad Hoc Meeting, Qingdao, China, Jun. 17, 2017.
PCT/KR2018/011588, International Search Report and Written Opinion, 9 pages, Jan. 10, 2019.
"LS on Bandwidth Part Operation in NR", R4-1707025, 3GP TSG RAN WG4 Meeting #84, Berlin, Germany, Rel-15, Jun. 27-30, 2017, 3 pages.
Samsung , "Procedures for UL Transmissions", R1-1716007, 3GPP TSG RAN WG1 Meeting NR#3, Nagoya, Japan, Agenda Item 6.3.3 4, Sep. 18-21, 2017, 4 pages.
Fujitsu , "SR procedure with multiple SR configurations", R2-1708865, 3GPP TSG-RAN WG2 Meeting #99, Berlin, Germany, Agenda Item 10.3.1.5, Aug. 21-25, 2017, 4 pages.
Intel Corporation , "Handling of multiple SR configurations", R2-1708789 (Revision R2-1707024) 3GPP TSG RAN WG2 Meeting #99, Berlin, Germany, Agenda Item 10.3.1.5, Aug. 21-25, 2017, 4 pages.
Mediatek Inc. , "Summary of Offline Discussion on Bandwidth Part Operation", R1-1716832, 3GPP TSG RAN WG1 Meeting NR#3, Nagoya, Japan, Agenda Item 6.3.4, Sep. 18-21, 2017, 7 pages.
Huawei, Hisilicon, et al.,Bandwidth part activation and adaptation, R1-1712155, 3GPP TSG RAN WG1 Meeting #90, Prague, Czech Republic, Agenda Item 6.1.3.3.9 ,Aug. 21-25, 2017 ,6 pages.

* cited by examiner

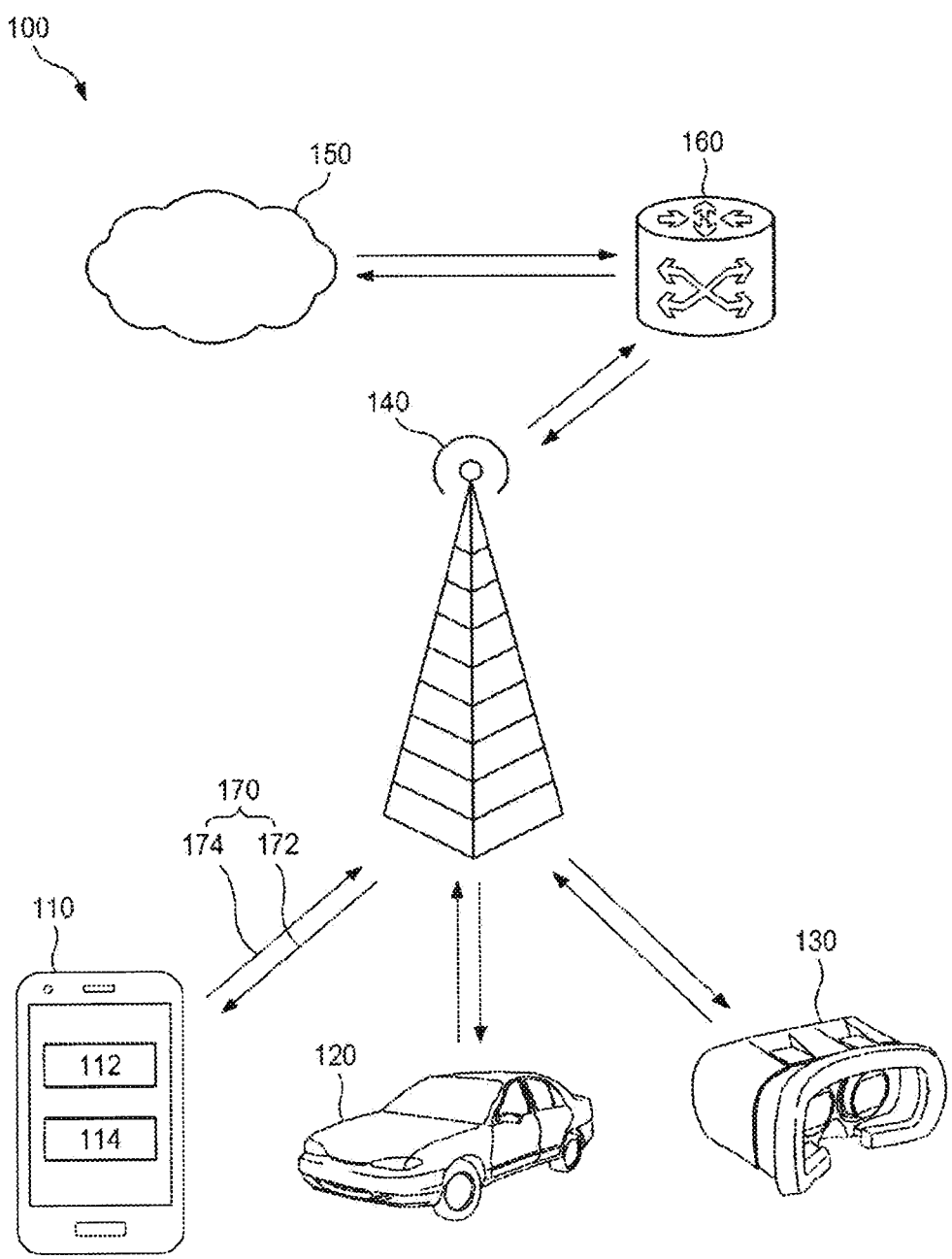
[Fig. 1]

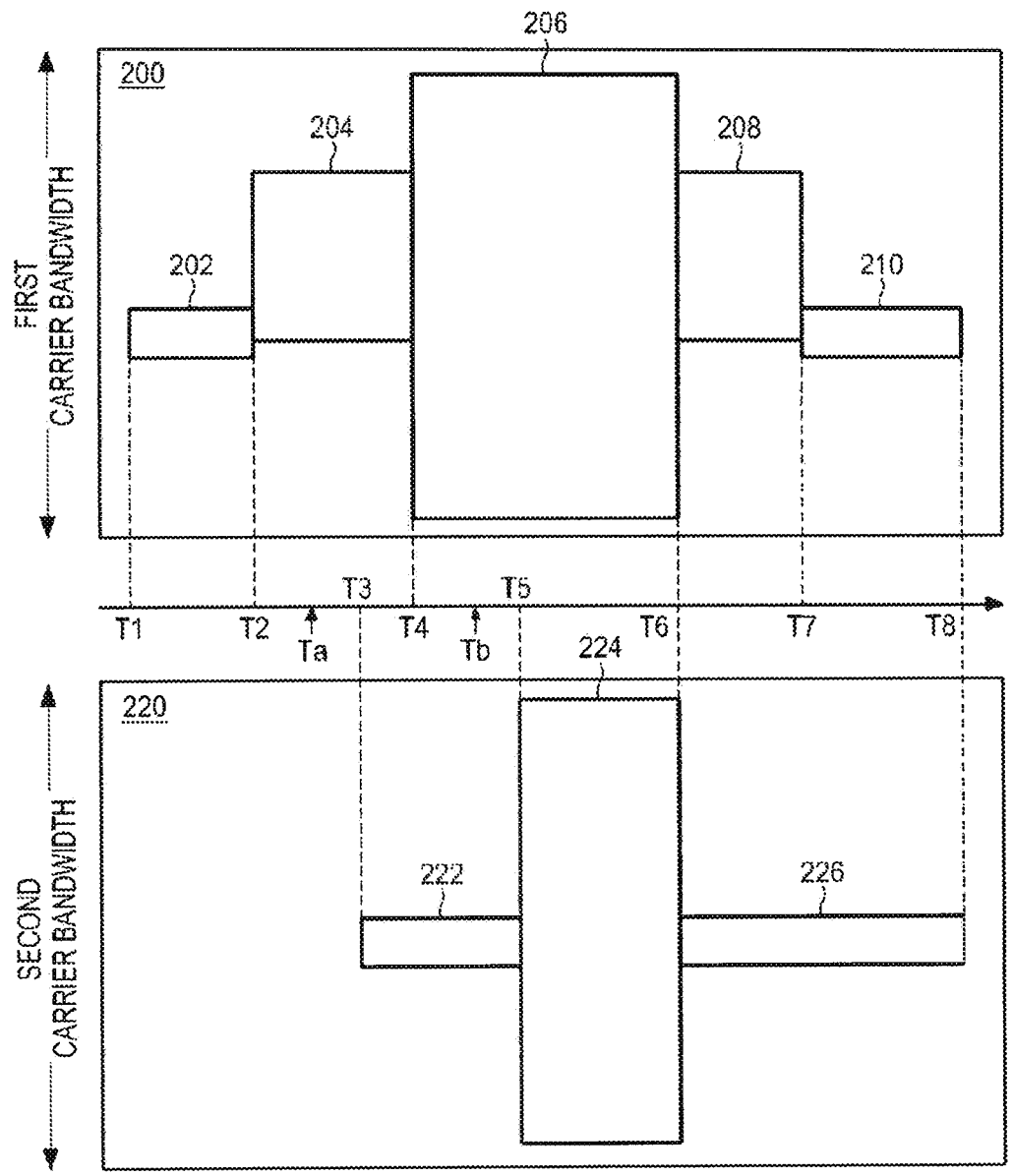
[Fig. 2]

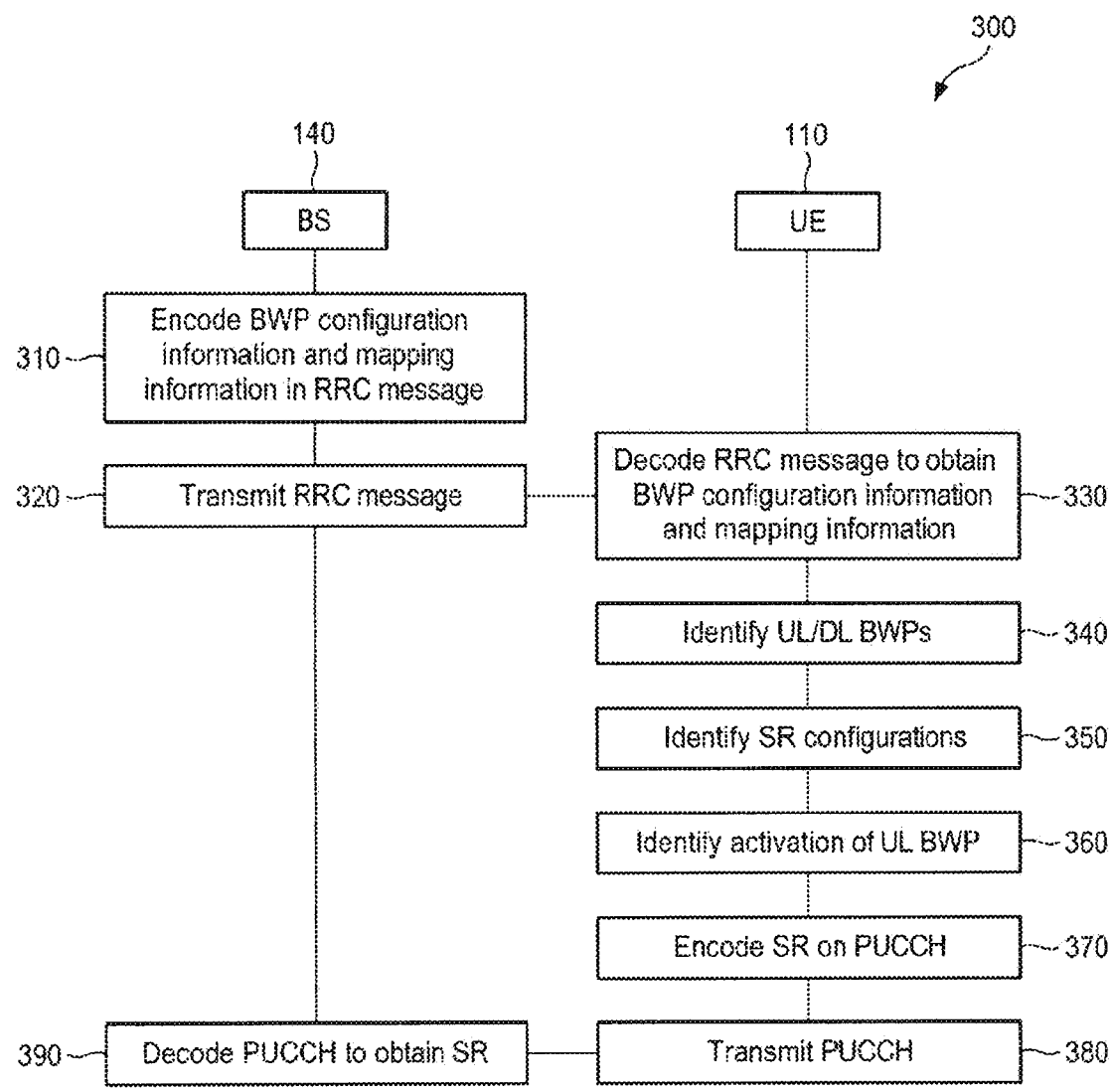
[Fig. 3]

[Fig. 4]
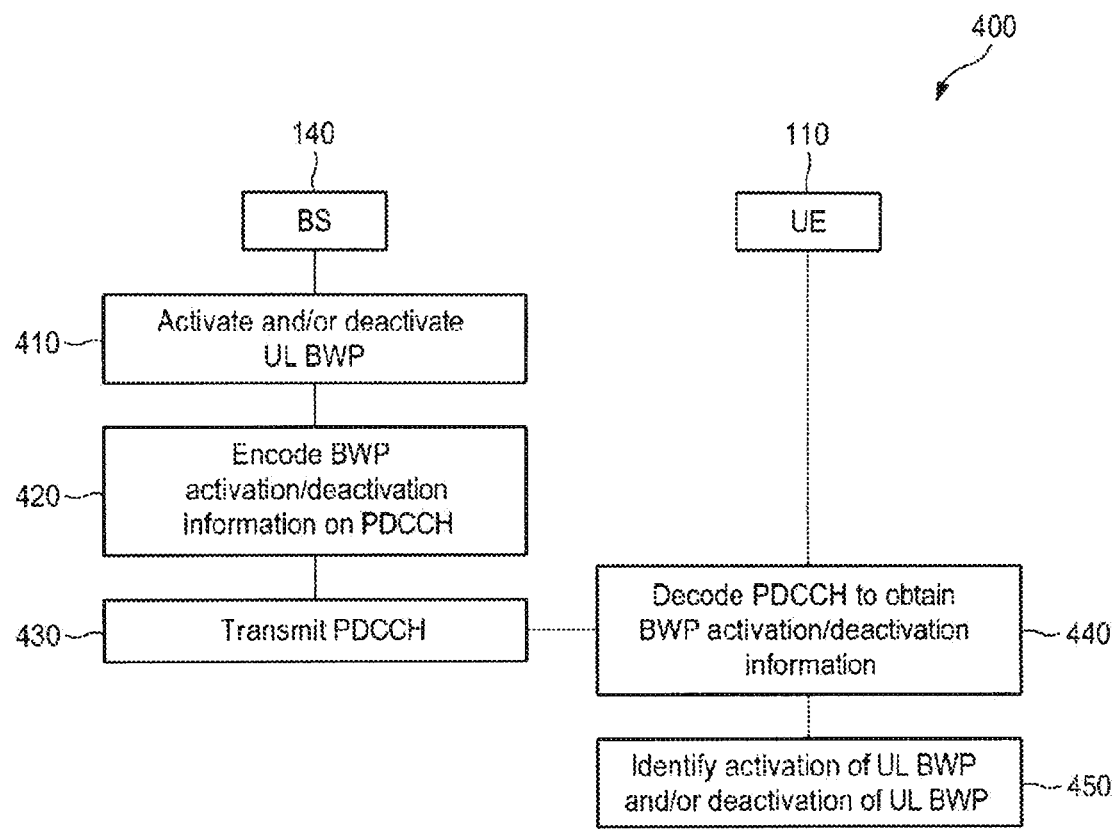

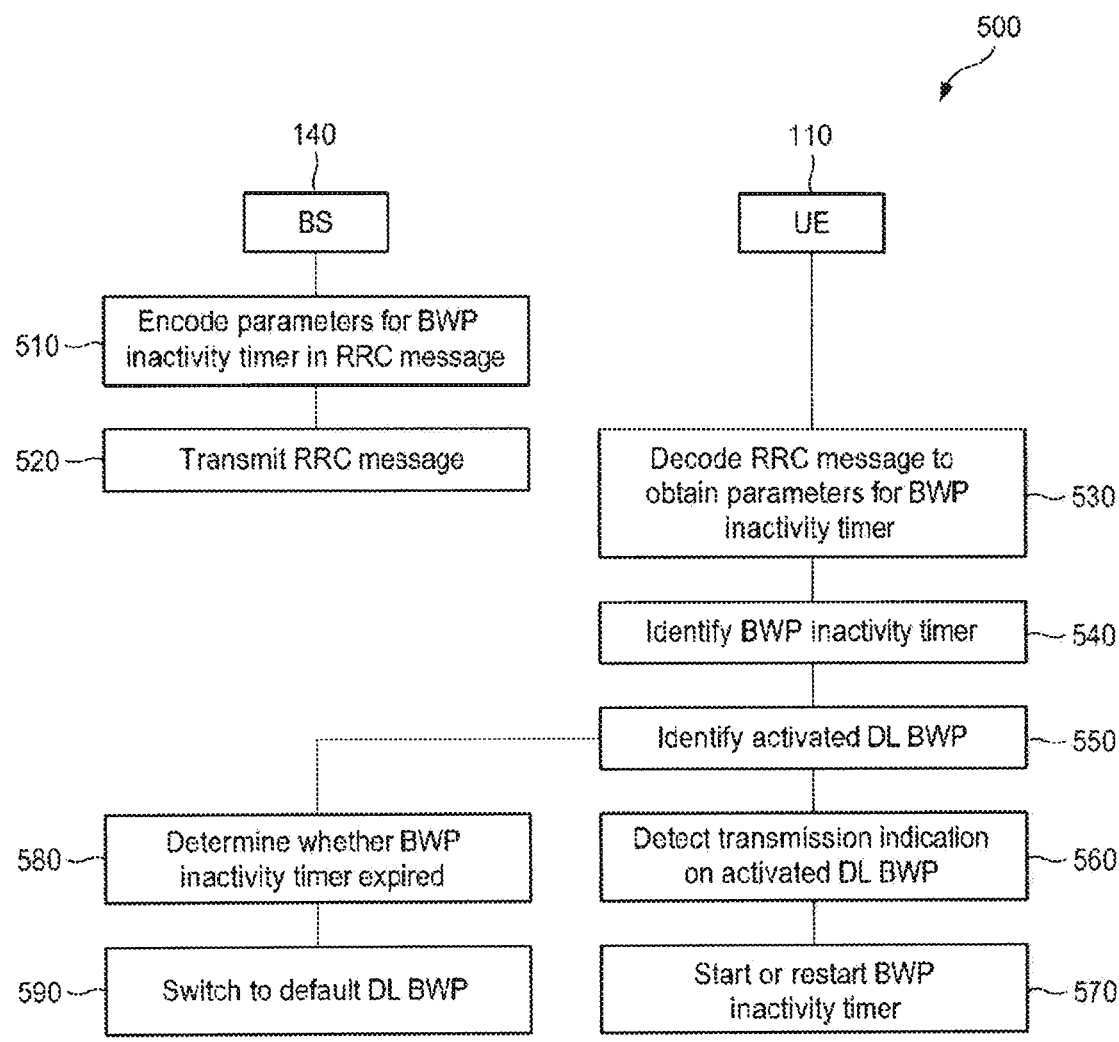
[Fig. 5]

[Fig. 6]
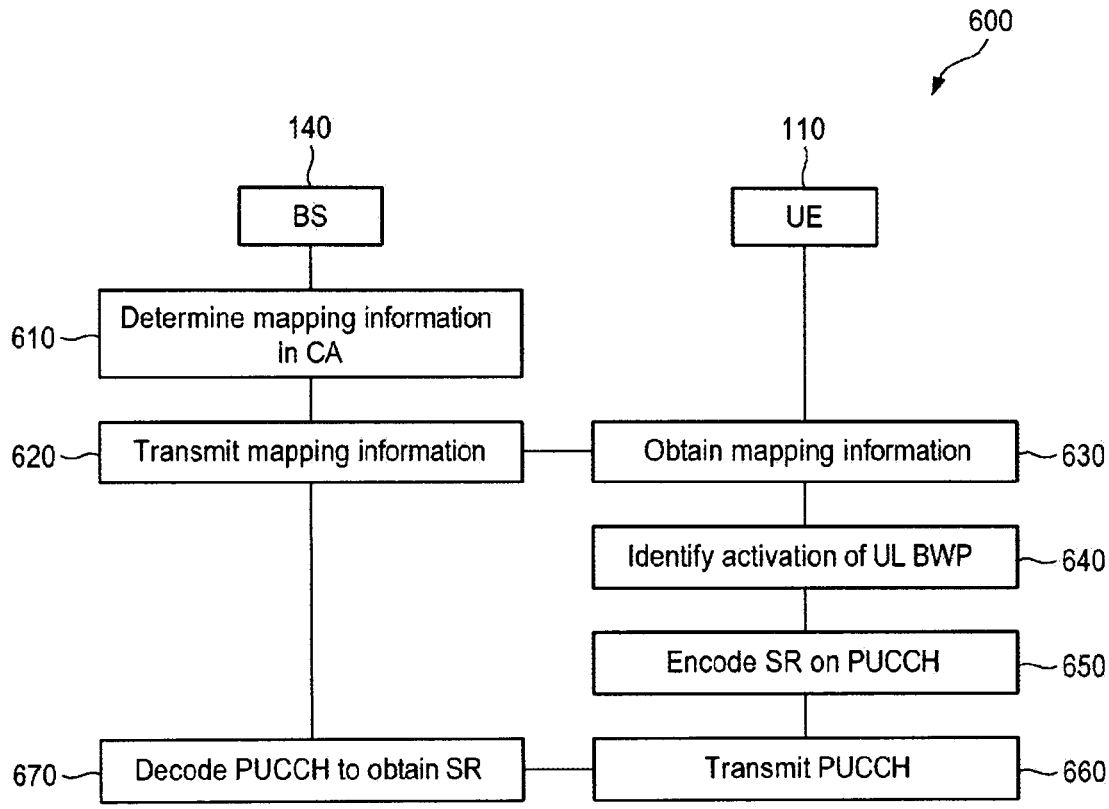
[Fig. 7]
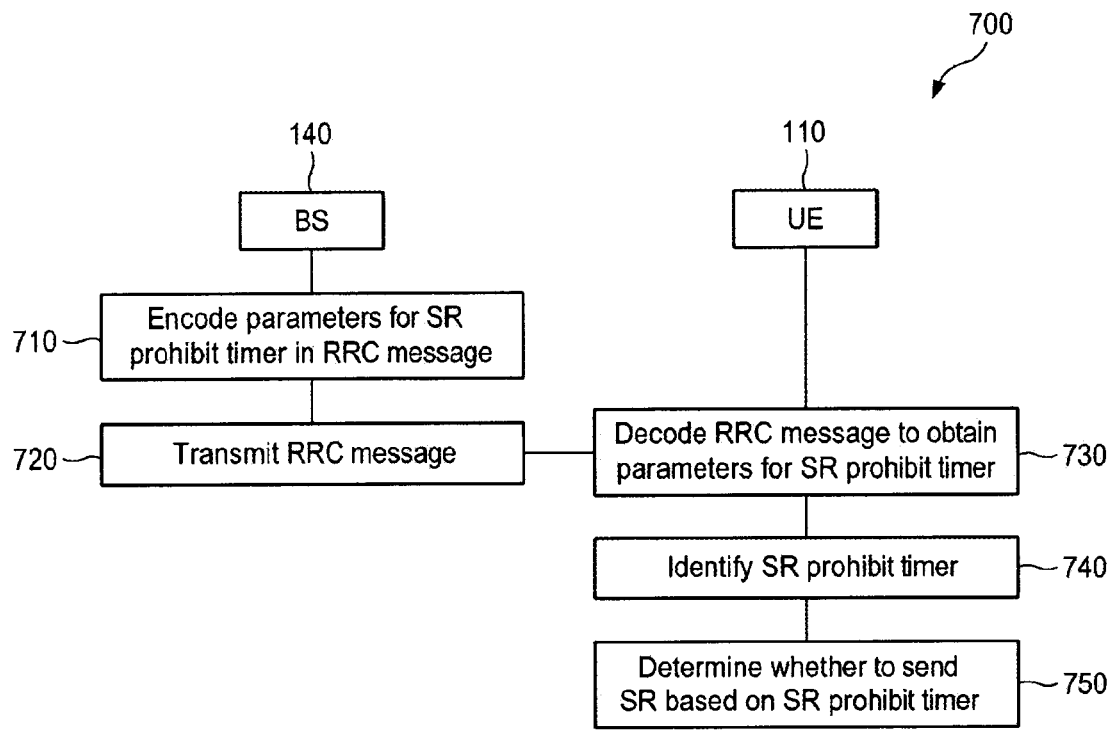

[Fig. 8]
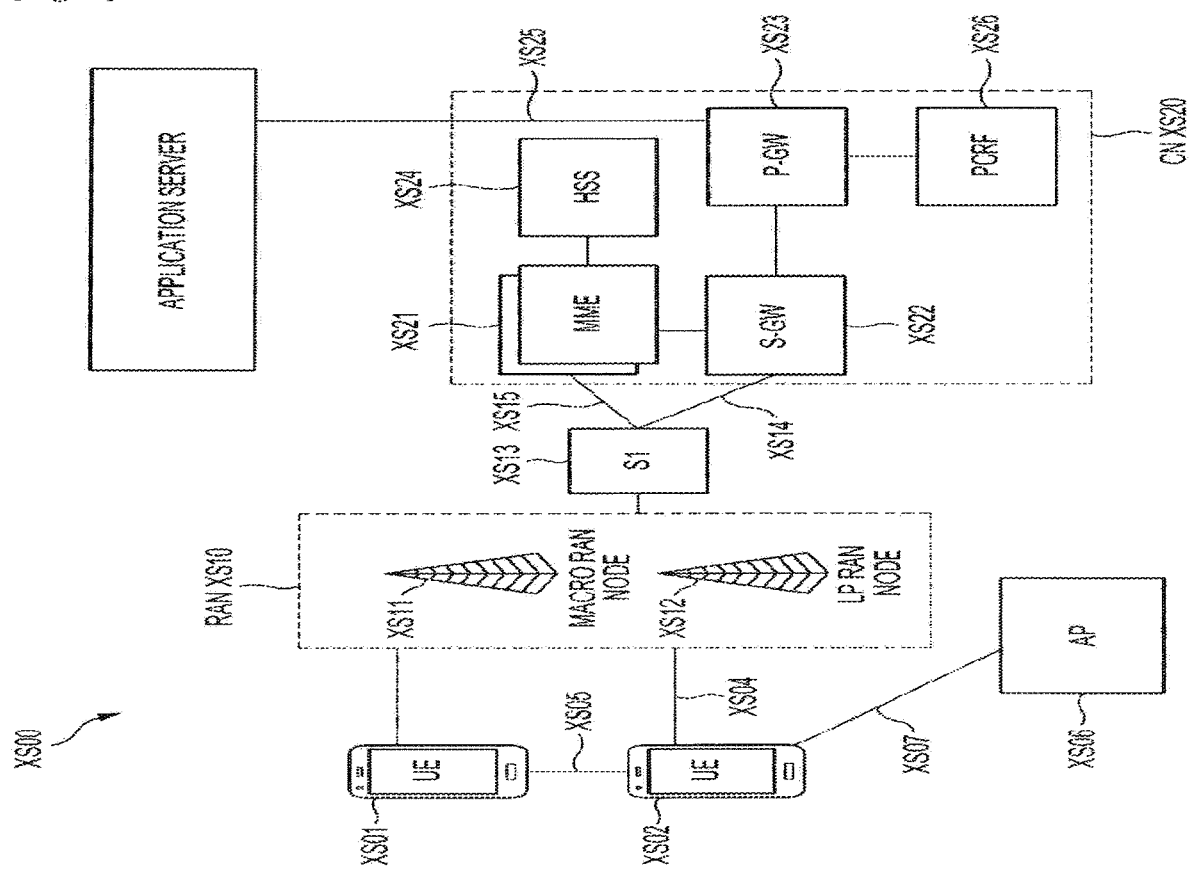

[Fig. 9]
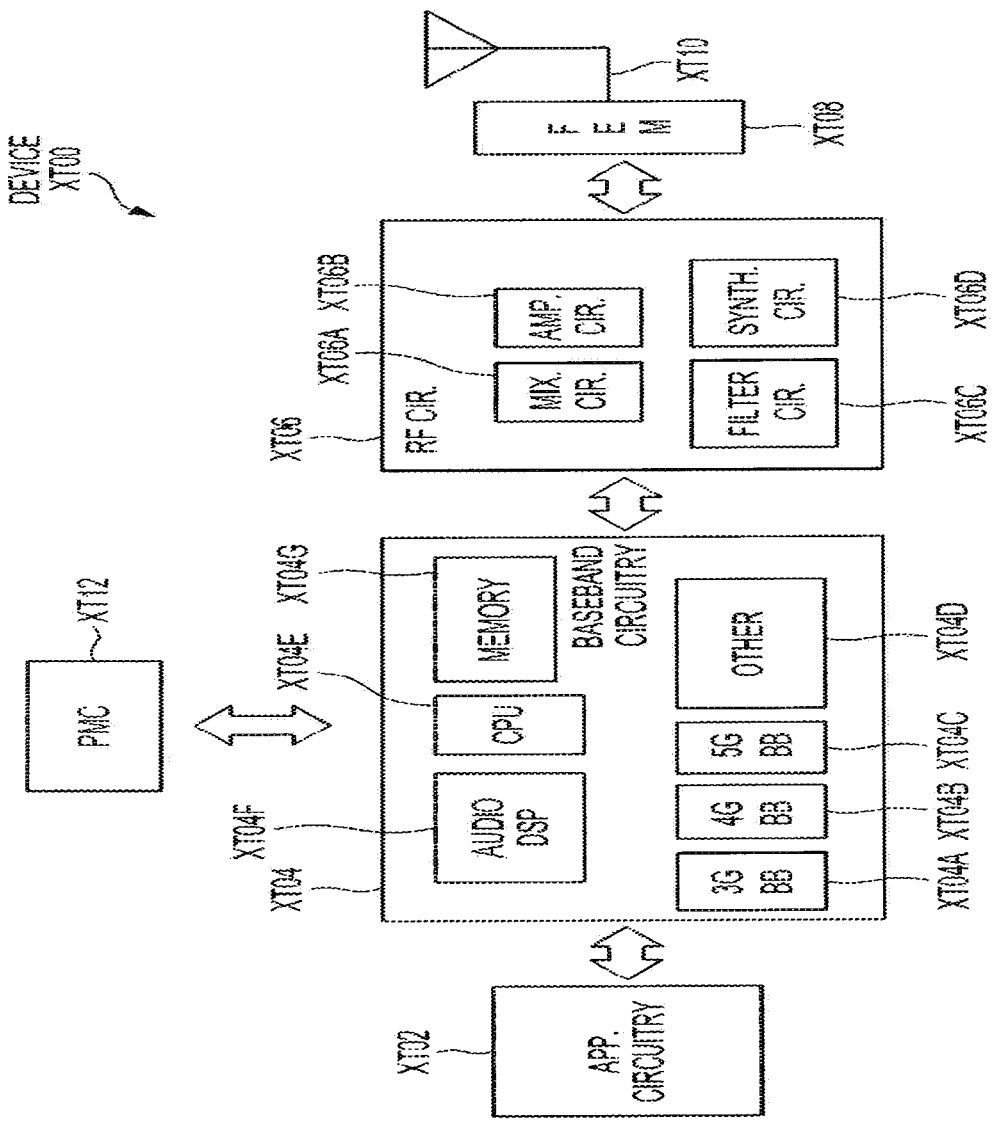

[Fig. 10]
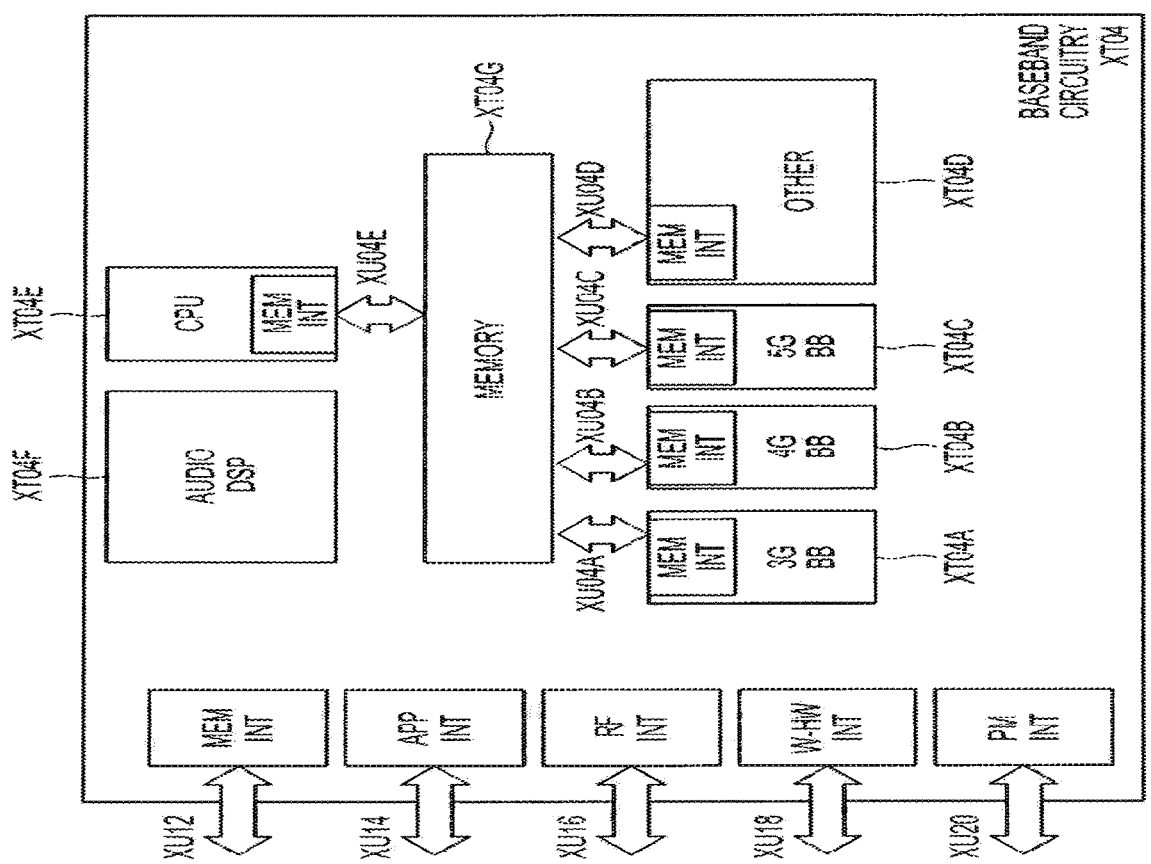

[Fig. 11]
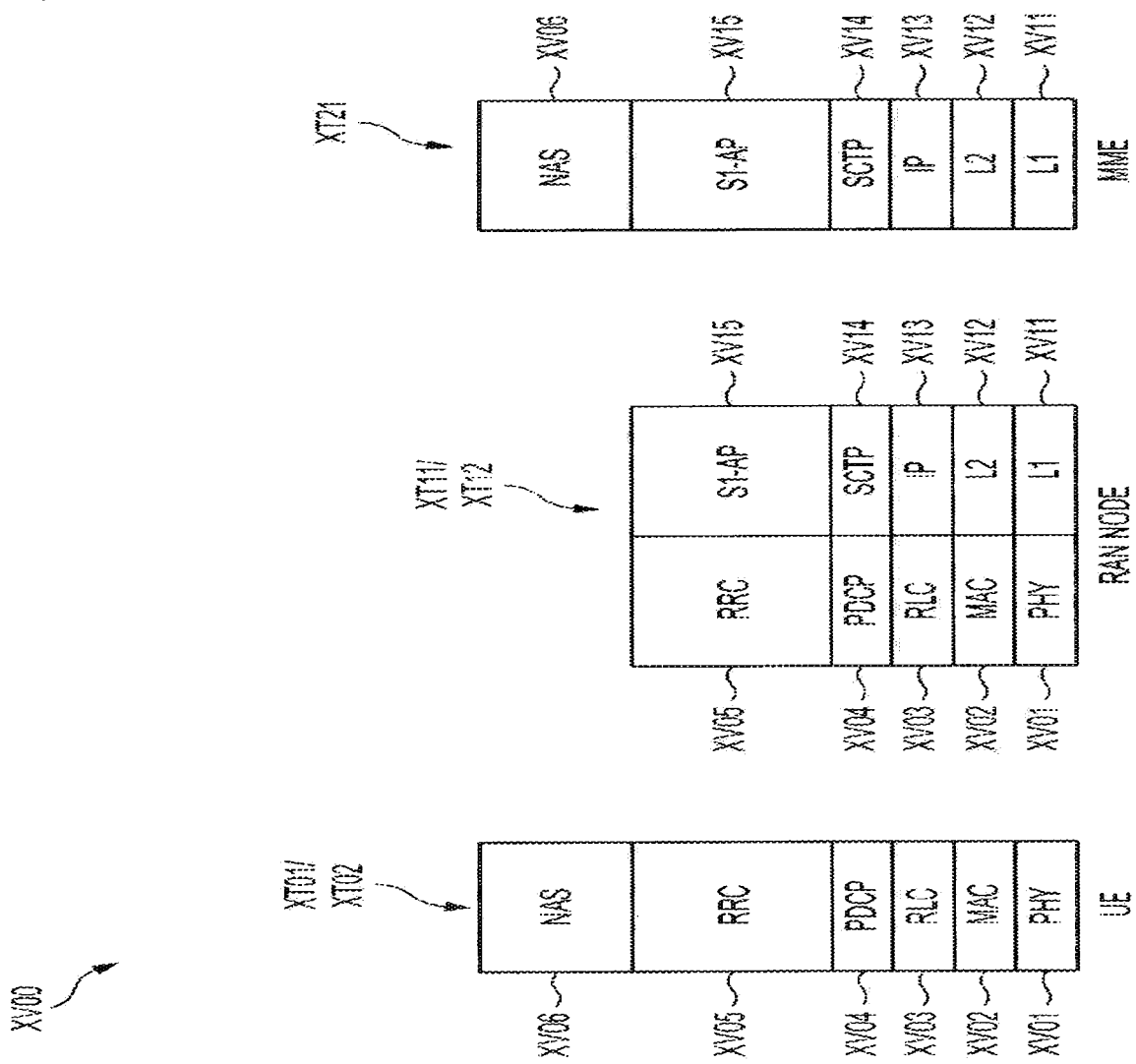

[Fig. 12]
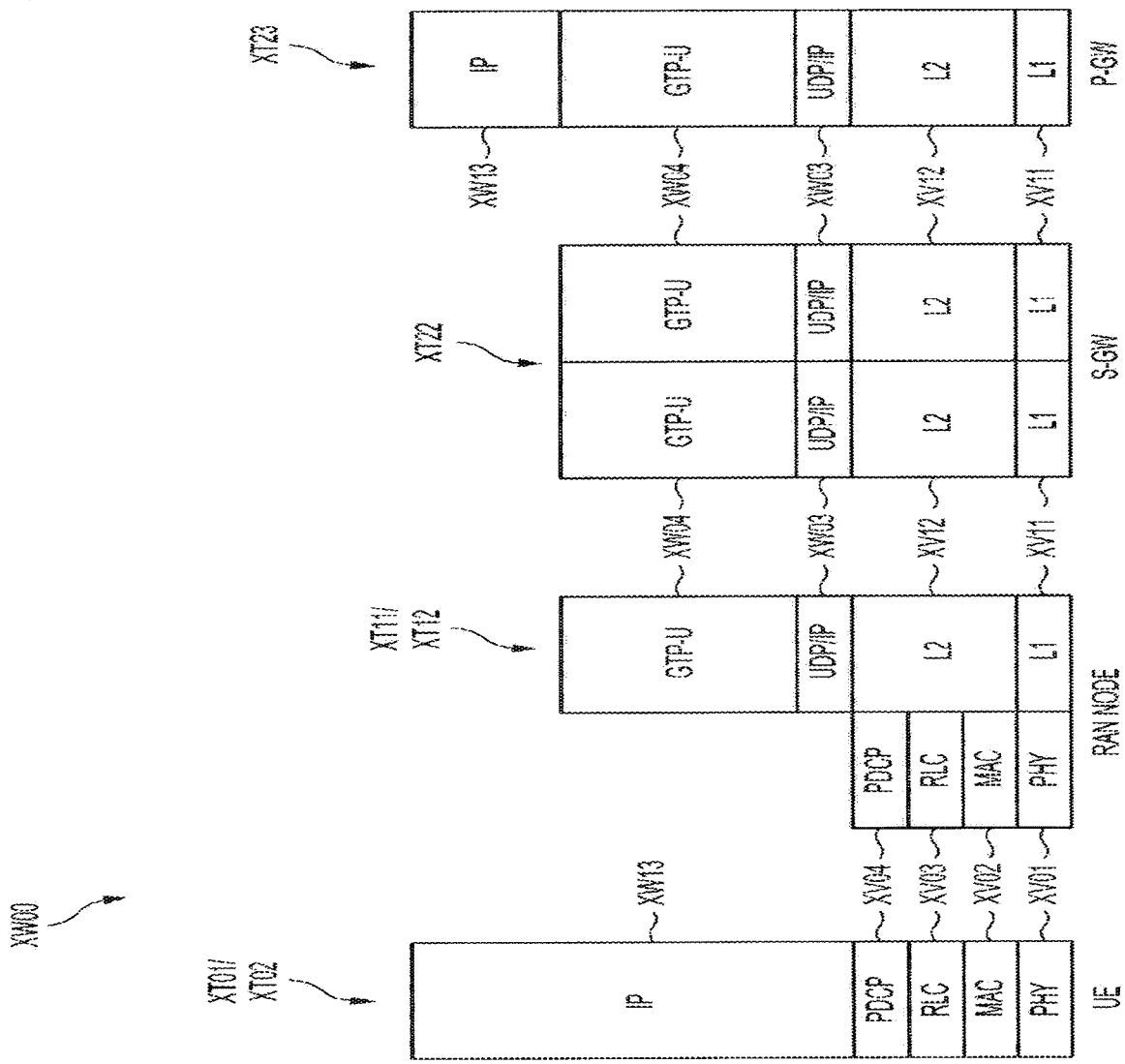

[Fig. 13]
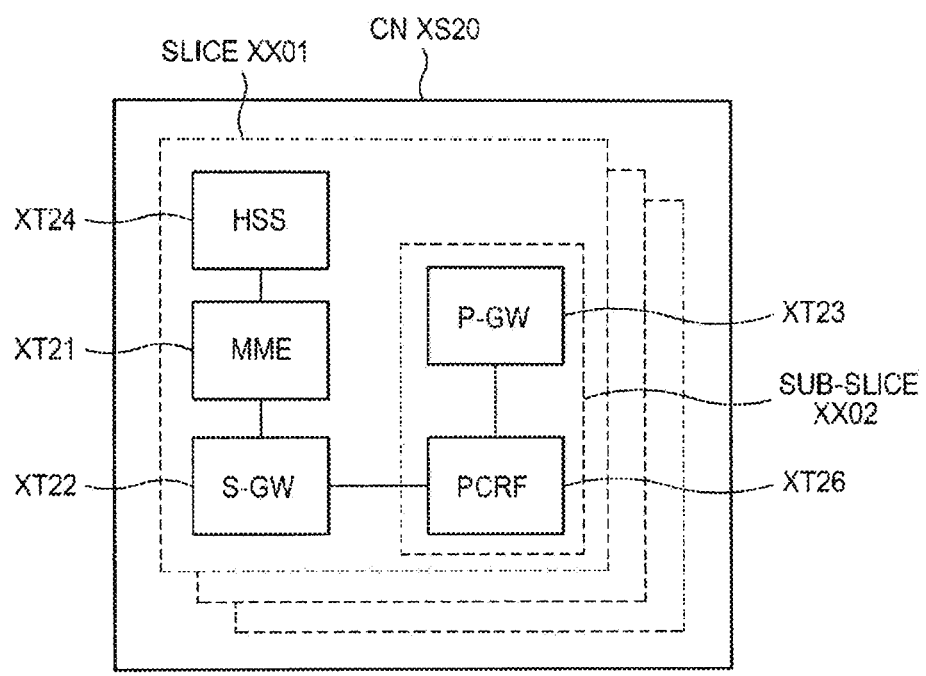

[Fig. 14]
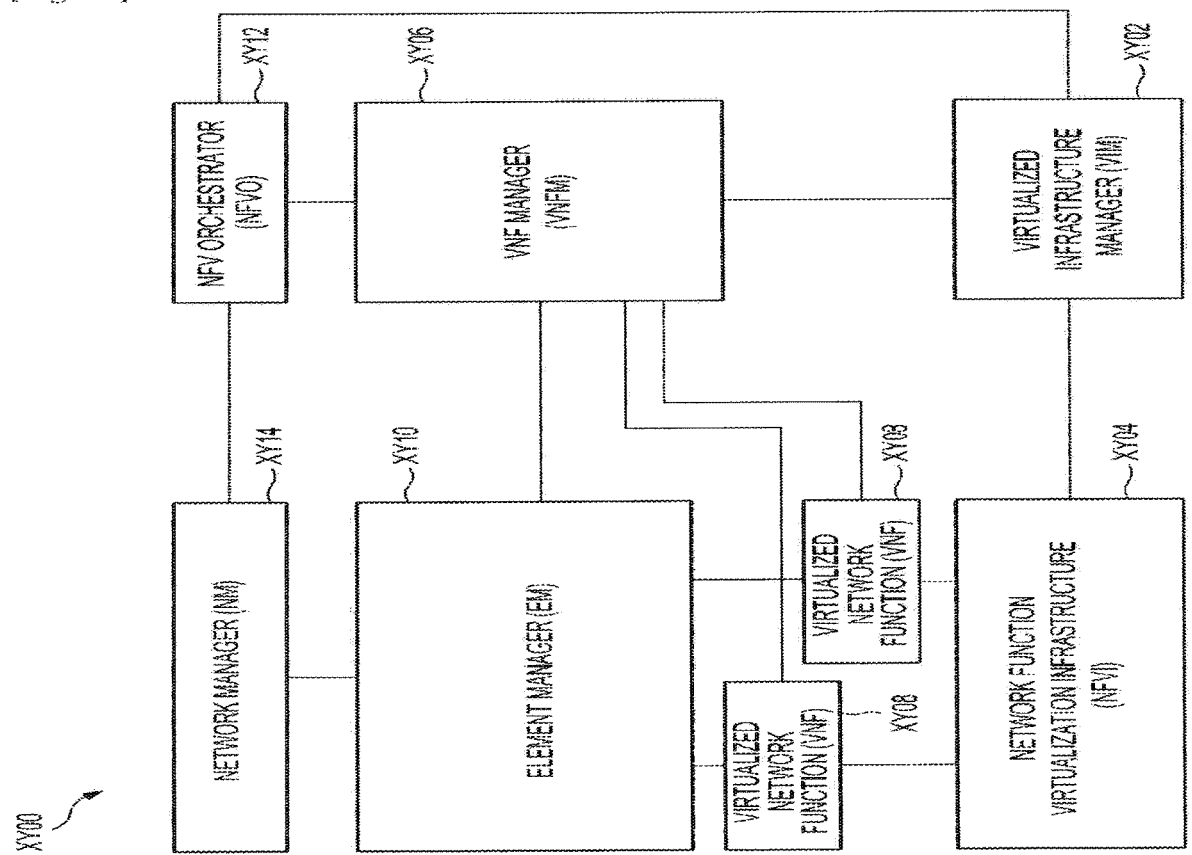

[Fig. 15]
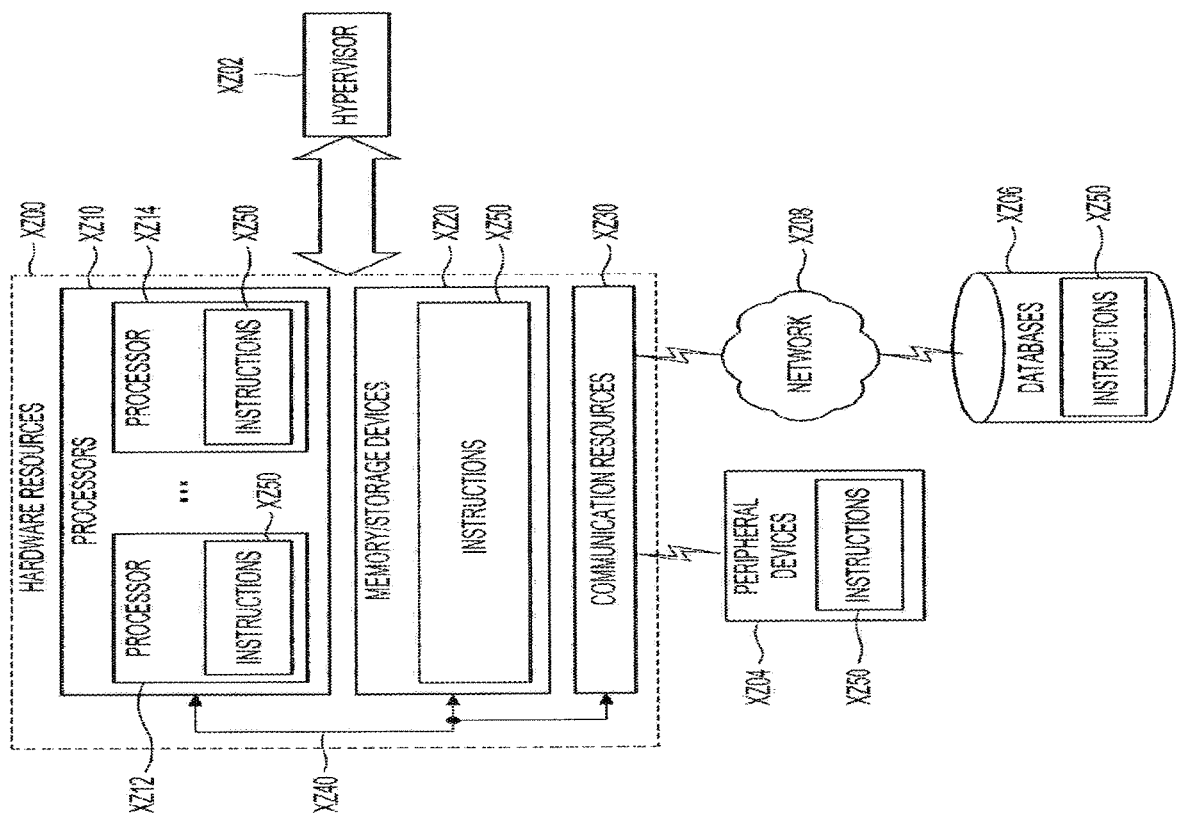

[Fig. 16]
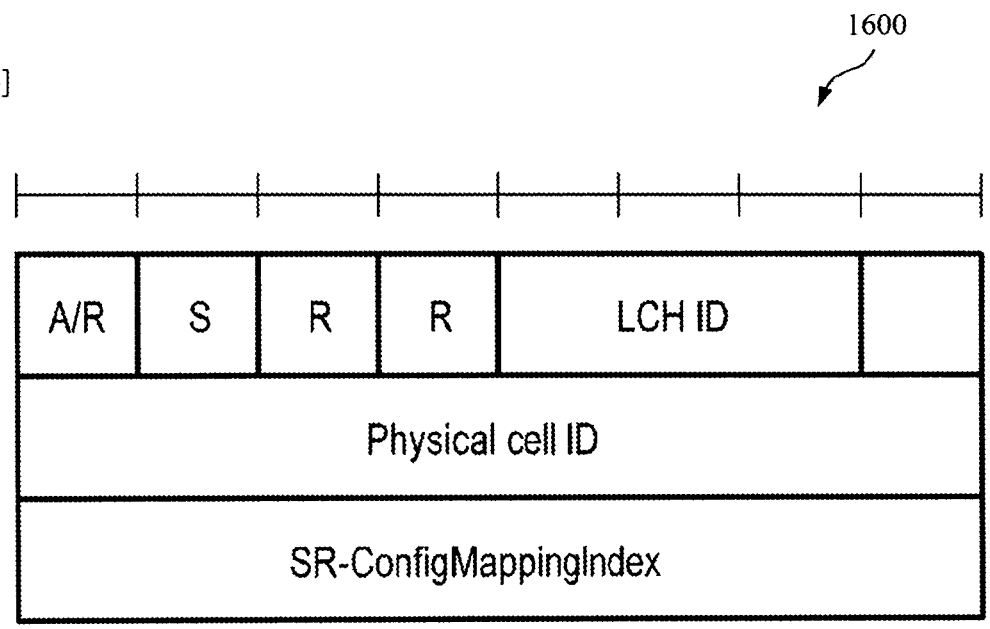
[Fig. 17]
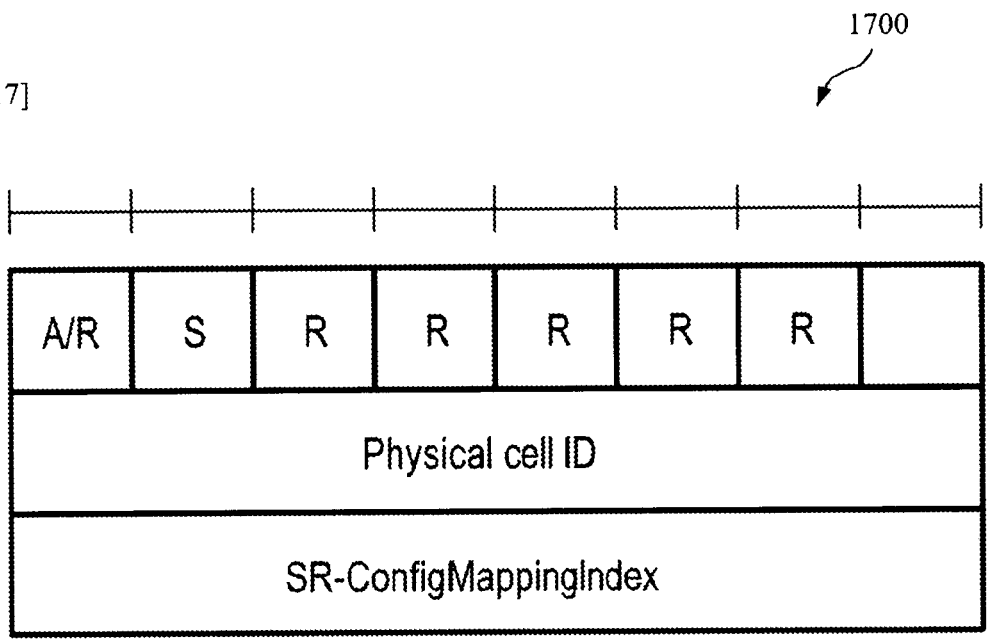

COMMUNICATION NETWORK APPARATUS FOR UPLINK SCHEDULING

The present application claims priority from U.S. Provisional Patent Application No. 62/564,870, filed Sep. 28, 2017, the entire disclosure of which is hereby incorporated by reference.

TECHNICAL FIELD

Various embodiments generally may relate to the field of wireless communications.

BACKGROUND ART

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Wireless networks may provide wireless communication to various user equipments (UEs). Each of UEs may support a variety of services such as an enhanced mobile broadband (eMBB) service or an ultra-reliable low latency (URLLC) service simultaneously or non-simultaneously. In order to transmit and receive data associated with services to a wireless network, UEs may transmit scheduling requests (SRs) for services to a wireless network so that suitable network resources may be allocated.

BRIEF DESCRIPTION OF DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 1 illustrates a schematic high-level example of a wireless network according to one embodiment of the present disclosure.

FIG. 2 illustrates dynamic switching of a bandwidth part (BWP) for data transmission according to one embodiment of the present disclosure.

FIG. 3 illustrates a flow chart of a SR procedure according to one embodiment of the present disclosure.

FIG. 4 illustrates a flow chart of a BWP switching procedure according to one embodiment of the present disclosure.

FIG. 5 illustrates a flow chart of configuration and operations of a BWP inactivity timer according to one embodiment of the present disclosure.

FIG. 6 illustrates a flow chart for handling SR configurations in Carrier Aggregation (CA) according to one embodiment of the present disclosure.

FIG. 7 illustrates a flow chart for configuration and operations of a SR prohibit timer according to one embodiment of the present disclosure.

FIG. 8 illustrates an architecture of a system of a network in accordance with some embodiments.

FIG. 9 illustrates example components of a device in accordance with some embodiments.

FIG. 10 illustrates example interfaces of baseband circuitry in accordance with some embodiments.

FIG. 11 is an illustration of a control plane protocol stack in accordance with some embodiments.

FIG. 12 is an illustration of a user plane protocol stack in accordance with some embodiments.

FIG. 13 illustrates components of a core network in accordance with some embodiments.

FIG. 14 is a block diagram illustrating components, according to some example embodiments, of a system to support NFV.

FIG. 15 is a block diagram illustrating components, according to some example embodiments, able to read instructions from a machine-readable or computer-readable medium and perform any one or more of the methodologies discussed herein.

FIG. 16 illustrates a MAC CE to map or re-map a logical channel to a SR configuration in a cell.

FIG. 17 illustrates a MAC CE to add or remove a SR configuration from a cell.

MODE FOR THE INVENTION

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

FIG. 1 illustrates a schematic high-level example of a wireless network 100 according to one embodiment of the present disclosure. The wireless network 100 includes multiple UEs, e.g., a UE 110 that may be a smartphone, a UE 120 that may be an onboard vehicle system, a UE 130 that may be a virtual reality equipment, and a base station 140, e.g., an eNB or a gNB, operating multiple services in physical resources of different configurations, in accordance with various embodiments. For clarity, features of an UE or a base station, e.g., the UE 110, the UE 120, the UE 130, or the base station 140, may be described below as examples for understanding an example UE, or a base station. It is to be understood that there may be more or fewer components within a UE or a base station. Further, it is to be understood that one or more of the components within a UE or a base station, may include additional and/or varying features from the description below, and may include any device that one having ordinary skill in the art would consider and/or refer to as a UE, or a base station. In the following, when a base station may be used, it may refer to an eNB, a gNB, or any type of station capable of communicating to UEs in any communication environment.

In embodiments, the wireless network 100 may include multiple UEs, e.g., the UE 110, the UE 120, the UE 130, and the base station 140 operating over a physical resource of a medium, e.g., a medium 170 or other medium. A medium, e.g., the medium 170, may include a downlink 172 and an uplink 174. The base station 140 may be coupled to a core network 150. In some embodiments, the core network 150 may be coupled to the base station 140 through a wireless communication router 160.

In embodiments, the UE 110, may operate multiple services, e.g., a service 112 or a service 114, in physical resources of different configurations. The service 112 may have a first priority, and the service 114 may have a second priority, where the second priority may be different from the first priority. A physical resource of a configuration associated with a service may include a logical channel (LCH) of the downlink 172 or the uplink 174 with an identification mapped to the configuration associated with the service. Similarly, other UEs, e.g., the UE 120, or the UE 130, may also operate multiple services in physical resources of different configurations, not shown.

In embodiments, the UE 110, may support multiple services, e.g., the service 112 or the service 114, which may be an eMBB service, an mMTC service, or an URLLC service. In embodiments, the wireless network 100 may be a 5G wireless network with NR technology, which may support an eMBB service, an mMTC service, and an URLLC service. The eMBB service may provide high bandwidth and data rate to various UEs, such as the virtual reality equipment, augment reality (AR) UEs, or highresolution video streaming UEs. The mMTC service may support a massive number of machine-type devices, e.g., the sensor, for operations such as logging, metering, monitoring, and measuring. The URLLC service may support delay-sensitivity services such as the tactile internet, vehicular-to-vehicular communication for the onboard vehicle system, which may include autonomous driving and remote control functionality.

In embodiments, through the uplink 174, the UE 110 may transmit a scheduling request (SR) for a physical resource associated with a specified service. The base station 140 may transmit and the UE 110 may identify an uplink grant through the downlink 172. Upon reception of the uplink grant, the UE 110 may transmit data associated with the specified service through the physical resource in the uplink 174. When a plurality of services, e.g., the service 112 and the service 114, are executed in the UE 110 simultaneously, the UE 110 may transmit a plurality of SRs, each corresponding to each of the services, sequentially or simultaneously.

The base station 140 may configure physical resources for SR transmission. The base station 140 may transmit configuration information of physical resources for SR transmission to the UE 110 through the downlink 172. Based on the transmitted information, the UE 110 may identify physical resources for SR transmission. At least a part of the physical resources may be activated so that the UE 110 may utilize for SR transmission. For example, first to fourth physical resources may be configured, and the third physical resource is activated. In this case, the UE 110 may transmit a SR through the third physical resource. The active physical resource may be dynamically switched. For example, before a certain time point, the third physical resource is activated. At the certain time point, the previously activated third physical resource is deactivated and the fourth physical resource is activated. In this case, the UE 110 may transmit a SR through the fourth physical resource after the certain time point.

In addition, the base station 140 may determine or define configurations for SR transmission (SR configurations). The base station 140 may transmit information of SR configurations to the UE 110 through the downlink 172. Based on the transmitted information, the UE 110 may identify SR configurations which a LCH is mapped to for physical resources. For example, the UE 110 may identify first to fourth SR configurations corresponding to first to fourth physical resources, respectively. When the UE 110 transmit a SR though a certain physical resource, e.g., the third physical resource, the third SR configuration may be used for SR transmission. SR configurations may be associated with, but not limited to, a numerology or a subcarrier spacing, a transmission time interval (TTI), a priority of a LCH, or combination thereof. The UE 110 may support multiple services simultaneously and transmit multiple SRs in different physical resources of different SR configurations. In some instances, in order to effectively allocate physical resources of different configurations, the base station 140 may collect information regarding logical channels associated with the triggered SRs from the UE 110.

In embodiments, the medium 170 may be a band in any frequency range (in particular 0 Hz-300 GHz), such as for example unlicensed bands (as the 5 GHz ISM band) or the licensed-by-rule approach which is applied by the FCC (Federal Communications Commission) to the 3.5 GHz Spectrum Access System (SAS) General Authorized Access (GAA) tier, etc. Some targets for future application may include the 28, 37 and 60 GHz bands. In particular, techniques that have been designed for unlicensed bands may be used straightforwardly (only adapting the channel access parameters as described in this document) but also various other systems can be used following a suitable adaptation (see for example the modification of 3GPP LTE to introduce LAA in the 5 GHz ISM band).

In embodiments, the wireless network 100 may include in particular the following: LTE and Long Term Evolution-Advanced (LTE-A) and LTE-Advanced Pro, 5th Generation (5G) communication systems, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE, 3 GPP LTE Advanced (Long Term Evolution Advanced)), 3 GPP LTE-Advanced Pro, CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications SystemTime-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3 GPP Rel. 11 (3rd Generation Partnership Project Release 11), 3 GPP Rel. 12 (3rd Generation Partnership Project Release 12), 3GPP Rel. 13 (3rd Generation Partnership Project Release 14), 3GPP Rel. 14 (3rd Generation Partnership Project Release 14), 3 GPP Rel. 15 (3rd Generation Partnership Project Release 15), 3 GPP Rel. 16 (3rd Generation Partnership Project Release 16), 3GPP Rel. 17 (3rd Generation Partnership Project Release 17), 3 GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), ETSI OneM2M, IoT (Internet of things), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WIDEN (Wideband Integrated Digital Enhanced Network), iBurst, Unlicensed Mobile Access (UMA, also referred to as 3GPP Generic Access Network, or GAN standard)), Wireless Gigabit Alliance (WiGig) standard, mmWave standards in general (wireless systems operating at 10-90 GHz and above such as WiGig, IEEE 802. Had, IEEE 802. Hay, etc.), etc. It is understood that such exemplary scenarios are demonstrative in nature, and accordingly may be similarly applied to other mobile communication technologies and standards.

FIG. 2 illustrates dynamic switching of a bandwidth part (BWP) for data transmission according to one embodiment of the present disclosure.

The UE 110 may support a wide bandwidth (e.g., 100 MHz). The UE 110 may not need to use the whole bandwidth to transmit or receive data for the whole time. Additionally, the base station 140 may not allow the UE 110 to utilize the whole bandwidth for the whole time. In order to effectively manage network resources, the wireless network 100 may dynamically control or adjust a bandwidth for data transmission according to time. In NR, the wireless network 100 may divide the whole carrier bandwidth into a plurality of sub-bands, i.e., BWPs, and allocate the BWPs for use in communicating between the UE 110 and the base station 140.

The UE 110 may be configured with one or more UL BWPs and one or more DL BWPs. A BWP may be a contiguous set of physical resource blocks, selected from a contiguous subset of the common resource blocks for a given numerology on a given carrier. Specific number of BWPs may be specified in DL and UL. For example, a maximum of four UL BWPs and four DL BWPs may be specified. The BW of a BWP may not exceed the configured bandwidth of component carrier for the UE 110. The base station 140 may configure multiple BWPs including DL BWPs and UL BWPs to the UE 110 via Radio Resource Control (RRC) signaling. The configured BWPs may overlap in frequency. For each serving cell, DL and UL BWPs are configured separately and independently and up to a specific number of BWPs, e.g., up to four BWPs, may be configured for DL and UL each. A DL BWP and a UL BWP may be jointly configured as a pair and up to a specific number of pairs, e.g., up to four pairs, can be configured.

In order to effectively manage network resources, the wireless network 100 may allow a part of configured BWPs to be used for data transmission at a certain time point between the UE 110 and the base station 140. To this end, the wireless network 100 may activate a specific number of BWPs while the rest of BWPs remains deactivated. For example, one DL BWP and one UL BWP are activated for the whole time. The UE 110 may receive and transmit within the frequency range configured for the active BWP. That is, the UE 110 may not be required to transmit or receive outside of the configured frequency range of the active BWP. Utilization of BWP may be a critical component for network apparatuses, e.g., the UE 110 and the base station 140 in NR system, to improve the energy efficiency. Since UEs are not always demanding high data rates, the use of wide BW may imply higher idling power consumption both from RF and baseband signal processing perspectives. In this regard, a newly developed concept of BWP for NR may provide a means of operating UEs with smaller BW than the configured CBW, which makes NR an energy efficient solution despite the support of wideband operation.

The network environment, conditions or statuses of the base station 140 and the UE 110 may be changed according to time. In order to dynamically manage network resources, the wireless network 100 may switch activated BWP(s) from time to time. For example, the wireless network 100 may switch narrow DL and UL BWPs to wide DL and UL BWPs on a determination that data to be transmitted is prioritized. On the contrary, the wireless network 100 may switch wide DL and UL BWPs to narrow DL and UL BWPs on a determination of no transmission indication for a specified time period or on a determination that data to be transmitted is less prioritized.

Multiple options may be supported for switching (activation and deactivation or inactivation) of BWPs. In addition to dedicated RRC signaling, downlink control information (DCI) based BWP switching may be supported. Further, the switching of BWPs by means of timer may be also supported. With this mechanism, if the UE 110 is not scheduled for a certain amount of time, i.e., expiration of timer, the UE 110 switches its active DL BWP (or DL/UL BWP pair) to the default one. There may be an initial active BWP for the UE 110 during the initial access until the UE 110 is explicitly configured with BWPs during or after RRC connection establishment. The initial active BWP may be the default BWP, unless configured otherwise. The HARQ retransmission across different BWPs may be supported when a UE's active BWP is switched.

As can be seen in FIG. 2, windows 200 and 220 show switching of active BWPs for first and second serving cells, respectively. The first serving cell may be a primary cell while the second serving cell may be a secondary cell. The BWPs may refer to DL BWPs, UL BWPs, or both of them. The base station 140 may configure a plurality of BWPs on or before T1. For example, BWPs 202, 204 and 206 may be configured within a first carrier bandwidth for the first serving cell. The base station 140 may transmit BWP configuration information to the UE 110 through a RRC message. The UE 110 may identify configured BWPs based on the BWP configuration information.

At T1, the base station 140 may activate the BWP 202. In embodiments, the base station may configure the BWP 202 as an initial BWP or a default BWP for the first serving cell so that the BWP 202 is initially activated. Activation information for the BWP 202 may be contained in the RRC message with the BWP configuration information. Based on the BWP activation information, the UE 110 may identify activation of the BWP 202. The UE 110 may monitor transmission indication on the BWP 202 and/or transmit data including a SR on the BWP 202 from T1 to T2.

At T2, the base station 140 may switch from the BWP 202 to the BWP 204. The base station 140 may transmit BWP activation/deactivation information indicative of de-activation of the BWP 202 and activation of the BWP 204 to the UE 110. Upon the reception of the BWP activation/deactivation information, the UE 110 may identify de-activation of the BWP 202 and activation of the BWP 204. The UE 110 may monitor transmission indication on the BWP 204 and/or transmit data on the BWP 204 from T2 to T4 for the first serving cell.

On or before T3, the base station 140 may configure and activate the second serving cell. In addition, on or before T3, the base station 140 may configure a plurality of BWPs, e.g., BWPs 222 and 224, within a second carrier bandwidth for the second serving cell. The base station 140 may activate the BWP 222 so that the UE 110 monitors transmission indication on the BWP 222 and/or transmit data on the BWP 222 from T2 for the second serving cell. The BWP configuration information and the BWP activation information may be transmitted from the base station 140 to the UE 110 through RRC signaling or PDCCH transmission.

At T4, the base station 140 may activate the BWP 206 and deactivate the BWP 204 for the first serving cell. Further, at T5, the base station 140 may activate the BWP 224 and deactivate the BWP 222 for the second serving cell. At T6, the base station 140 may deactivate the BWP 206 and activate a BWP 208 which has the same bandwidth as the BWP 204 for the first serving cell. Further, at T6, the base station 140 may deactivate the BWP 224 and activate a BWP 226 which has the same bandwidth as the BWP 222 for the second serving cell. At T7, the base station 140 may deactivate the BWP 208 and activate the BWP 210 for the first serving cell. At T8, the base station 140 may deactivate the BWP 210 for the first serving cell and the BWP 226 for the second serving cell.

The BWP switching operations at T1, T2, T4 and T6 for the first serving cell and at T3 and T5 for the second serving cell may be performed by the base station 140. For example, the base station 140 may execute BWP switching on or before those time points, and transmit the BWP switching information through a RRC message or a PDCCH. The BWP switching operations at T6 for the second serving cell and at T7 for the first serving cell may be performed by the UE 110 based on an expiry of a BWP inactivity timer. The BWP switching operations at T8 may be performed by the base station 140. For example, the base station 140 may be disconnected from the UE 110 due to certain reasons such as a hand over. BWP switching operations may occur based on various communication environment, or statuses of the base station 140 and/or the UE 110. The BWP switching operation at T2, T3, T4 and T5 may occur when a quantity or priority of data to be transmitted to or from the UE increases. On the contrary, the BWP switching operation at T6 and T7 may occur when a quantity or priority of data to be transmitted to or from the UE decreases.

In embodiments, SR transmission may be performed within a bandwidth on an activated BWP. For example, if a SR is to be transmitted to the base station 140 from the UE 110 at Ta, the UE 110 may encode the SR on a Physical Uplink Control Channel (PUCCH) in the BWP 204 for the first serving cell. If multiple serving cells are configured, the UE may transmit through multiple activated BWPs for configured serving cells. For example, if a SR is to be transmitted to the base station 140 from the UE 110 at Tb, the UE 110 may encode the SR on a PUCCH in the BWP 206 for the first serving cell and in the BWP 222 for the second serving cell. Additionally, a SR configuration which a LCH is mapped to for the activated BWP may be used in transmitting the SR. For example, if a SR is to be transmitted to the base station 140 from the UE 110 at Ta, the UE 110 may encode the SR on a PUCCH in the BWP 204 based on a SR configuration corresponding to the BWP 204 and transmit the SR using the SR configuration.

FIG. 3 illustrates a flow chart 300 of a SR procedure according to one embodiment of the present disclosure. Further, the features of handling multiple SR configurations when the UE 110 is configured with multiple BWPs are described below.

When data to be transmitted to the base station 140 occurs in the UE 110, the UE 110 may need to be allocated resources necessary for data transmission from the base station 140. To this end, the UE 110 may be allocated resources for data transmission by transmitting a SR to the base station 140. The resources used by the UE 110 to transmit a SR may be configured in advance by the base station 140. For example, the UE 110 may use a PUCCH to send a SR. Upon reception of the SR from the UE 110, the base station 140 may configure an uplink resource and notify the UE 110 of the uplink resource. Hereinafter, an exemplary SR procedure is described with reference to FIG. 3.

As can be seen in FIG. 3, the base station 140 may encode BWP configuration information and mapping information in a RRC message, at 310. The BWP configuration information may be associated with one or more UL BWPs and one or more DL BWPs within a carrier bandwidth per serving cell. The mapping information may be indicative of a correlation between an LCH and one or more SR configurations for the UL BWPs in the message. The LCH may be a resource of an uplink and a downlink between the base station 140 and the UE 110. The BWP configuration information and the mapping information may be encoded in one RRC message, but the disclosure is not limited to. In some instances, the information may be encoded in multiple RRC messages. At 320, the base station 140 may transmit the RRC message to the UE 110. The RRC message may be transmitted through a PDSCH (Physical Downlink Shared Channel). If the information is encoded in multiple messages, each of the RRC messages may be encoded or transmitted, independently.

At 330, the UE 110 may receive and decode the RRC message to obtain the BWP configuration information and the mapping information. Based on the BWP configuration information, the UE 110 may identify one or more UL BWPs and one or more DL BWPs configured within a carrier bandwidth per serving cell, at 340. Further, the UE 110 may identify one or more SR configurations which a logical channel (LCH) is mapped to for the UL BWPs based on the mapping information, at 350. The LCH may be mapped to none or one SR configuration for each of the UL BWPs.

At 360, the UE 110 may identify activation of a UL BWP of the configured UL BWPs. At 370, the UE 110 may encode an SR on a PUCCH based on a SR configuration for the activated UL BWP. Then, the UE 110 may transmit the PUCCH to the base station 140, at 380. The PUCCH may be associated with a SR configuration for the activated UL BWP so that the UE 110 may utilize the SR configuration in encoding the SR and transmitting the PUCCH. At 390, the base station 140 may receive and decode the PUCCH transmitted from the UE 110 to obtain the SR.

After 390, in response to obtaining the SR, the base station 140 may encode and transmit an uplink grant to the UE 110. The uplink grant may be associated with allocation of an uplink resource to the UE 110. The UE 110 may receive the uplink grant from the base station 140 and transmit uplink data to the base station 140 through the allocated uplink resource. Regarding the uplink date transmission, the UE 110 may notify the base station 140 of an existence of the uplink data to be transmitted through a buffer status report (BSR).

In some embodiments, the UE 110 may encode a BSR on a PUSCH. A variable BSR format may be used to inform notify the base station 140 of one or all LCGs belonging to one or more serving cells, or one or more BWPs. To this end, the BSR may include a Logical Channel ID (LCID) field indicative of a variable truncated BSR. For example, if the padding BSR is triggered and three bytes of space are available, it may be possible to report the BSR of three LCGs by using the variable BSR format. If the UE 110 has data to transmit in more than 3 LCGs, the truncated variable BSR indicating that the UE 110 has data to transmit in more than three LCGs may be triggered. It may also be possible to report the BSR of one LCG with finer granularity than that of one byte short BSR or truncated short BSR.

In accordance with the mapping information, multiple options may be supported for only one active UL BWP. In one option, a LCH may be mapped to different SR configurations belonging to different UL BWPs. In this case, it may not be different in terms of SR configurations and their mapping whether or not the UE 110 switches from a wider BWP to a narrow BWP or vice versa. In another case, the SR configuration in a UL BWP may imply numerology/TTI of the LCH and the SR configuration in another UL BWP may imply the priority of the same LCH associated with the triggered the SR. Therefore, when the UE 110 switches the UL BWP, the SR configuration of a LCH in another UL BWP may carry different information. Also the parameters for the SR configurations may be different for each configured UL BWP.

In another option, the base station 140 may monitor any UL transmission in a default UL BWP in addition to an active BWP. There may be a case where a LCH has no SR configuration in the current active BWP, or the LCH belongs to a SR configuration in the current active BWP but carries a different information, e.g., priority. In this case, the UE 110 may switch to a default BWP if the LCH has a mapped SR configuration in the default BWP to transmit the SR associated with the LCH. The default BWP may be configured with one or more default SR configurations. The default SR configurations may be used if the LCH is not mapped to any other SR configurations nor SR resource is available in the active BWP for any serving cell, e.g., SpCell or SCell.

In embodiments, the UE 110 may be configured with multiple BWPs and one or more BWPs may be active at the same time. The UE 110 may transmit a SR in multiple BWPs with non-overlapping resources in time domain. Multiple options may be supported for multiple active UL BWPs. In one option, a LCH may be mapped to zero or one SR configuration belonging to a BWP. The UE may use SR configurations in different BWPs based on the LCH associated with the SR.

In another option, a LCH may be mapped to zero or one SR configuration per BWP. A LCH may be mapped to multiple SR configurations each belonging to different BWPs. In this case, the SR configurations belonging to different BWP may imply different information, e.g., numerology, TTI, priority, or prioritized bit rate, of the LCH associated with SR. In one example, a LCH x may be mapped to SR configuration y belonging to BWP m. The LCH x may also be mapped to SR configuration y belonging to BWP n. An SR may be triggered associated with LCH x. The SR transmitted using the SR configuration y belonging to the BWP m may imply the numerology/TTI of the LCH x while the SR transmitted using the SR configuration y belonging to BWP n may imply the priority of the LCH x.

In another option, a LCH may be mapped to multiple SR configurations each belonging to different BWPs and each having different SR periodicity. This may be applicable for reducing the latency and SR diversity.

In another option, a BWP may be configured with one or more default SR configurations. If a LCH has no resource in a BWP, the SR associated with the LCH is failed or unsuccessful, or a BWP is deactivated, the UE may use the default SR configuration in the BWP to transmit the SR. The default SR may be common to all LCHs. In this case, it may not imply additional information of the LCH. A default SR configuration may be associated with a particular LCH. In this case, it may imply additional information of the LCH. The default SR configuration may be configured in a default BWP.

In one example, a default SR may be configured either in SpCell or in one of the PUCCH SCells by dedicated RRC signaling. The sr-PUCCH-ResourceIndex may be associated with the UL BWP.

TABLE 1

MAC-CellGroupConfig ::= SEQUENCE { -- SR configuration
schedReqToAddModList SchedReq-ToAddModList OPTIONAL, -- Need N
schedReqToReleaseList SchedReq-ToReleaseList OPTIONAL -- Need N}
PCellConfigDedicated ::= SEQUENCE {default-sr-configSchedulingRequestConfig
OPTIONAL, -- Need S -- Default SR configuration common to all LCHs}
OPTIONAL SCellConfigDedicated ::= SEQUENCE {default-sr-config
SchedulingRequestConfig OPTIONAL, -- Need S -- Default SR configuration common to all
LCHs} OPTIONALSchedReqToAddModList ::= SEQUENCE (SIZE
(1..maxSchedReqPerCell)) OF SchedReqToAddModSchedReqToReleaseList ::=
SEQUENCE (SIZE (1..maxSchedReqPerCell)) OF TABLE 1-continued

```
SR-configMappingIndexSchedReq-ToAddMod ::= SEQUENCE {
sr-configMappingIndex SR-configMappingIndex, - sr-configMappingIndex is used, for
later reconfiguration/removal of one SR configuration sr-config
SchedulingRequestConfig OPTIONAL, -- Need S logicalChannels SEQUENCE
(SIZE(1..maxLCH)) OF LogicalChannelIdentity - provides the list of logical channels
mapped to this SR}-- NOTE: maxLCH is the value for
logicalChannelToAddModList-- NOTE: LogicalChannelIdentity is the type used for
logicalChannelToAddModListSR-configMappingIndex::=            INTEGER
(1..maxSchedReqPerCell)maxSchedReqPerCell INTEGER ::= 8 -- Maximum number
of simultaneous SR configurations per serving cell with
PUCCHSchedulingRequestConfig ::= SEQUENCE { sr-prohibitTimer ENUMERATED { u20, u40, u64,
u128, u512, u1024, u2560, spare1}, sr-TransMax ENUMERATED { n3, n4, n5, n6,
n7, n8, n10, n20, n50, n100, n200} sr-PUCCH-ResourceIndexINTEGER (0..2047),
sr-ConfigIndexINTEGER (0..157) }}
```

[Default SR Configuration Common to all LCHs]

In another example, a default SR configuration associated with each LCH having a valid SR configuration may be defined either in SpCell or in one of the PUCCH SCells by dedicated RRC signaling.

Based on the BWP activation/deactivation information, the UE 110 may identify activation of a UL BWP of configured UL BWPS and/or deactivation of a previously activated BWP, at 450. The UE 110 may monitor transmission indication of DL data within a bandwidth on the activated BWP.

TABLE 2

```
MAC-CellGroupConfig ::= SEQUENCE { -- SR configuration
schedReqToAddModList SchedReq-ToAddModList OPTIONAL, -- Need N
schedReqToReleaseList SchedReq-ToReleaseList OPTIONAL -- Need N}
PCellConfigDedicated ::= SEQUENCE {default-schedReq-ToAddModList
SchedReqToAddModList OPTIONAL, -- Need
NdefaultschedReqToReleaseListSchedReq-ToReleaseList OPTIONAL -- Need N -- Default SR configuration
associated with each LCH} OPTIONAL SCellConfigDedicated ::= SEQUENCE {
defaultschedReqToAddModListSchedReq-ToAddModList OPTIONAL, --
Need Ndefault-schedReq-ToReleaseListSchedReq-ToReleaseList OPTIONAL --
Need N -- Default SR configuration associated with each LCH} OPTIONAL
SchedReq-ToAddModList ::= SEQUENCE (SIZE (1..maxSchedReqPerCell)) OF
SchedReq-ToAddModSchedReq-ToReleaseList ::= SEQUENCE (SIZE
(1..maxSchedReqPerCell)) OF SR-configMappingIndexSchedReq-ToAddMod ::=
SEQUENCE { sr-configMappingIndex SR-configMappingIndex, -
sr-configMappingIndex is used, for later reconfiguration/removal of one SR
configuration sr-config SchedulingRequestConfig OPTIONAL, -- Need S
logicalChannels SEQUENCE (SIZE(1..maxLCH)) OF LogicalChannelIdentity - provides
the list of logical channels mapped to this SR}-- NOTE: maxLCH is the value for
logicalChannel-ToAddModList-- NOTE: LogicalChannelIdentity is the type used for
logicalChannel-ToAddModListSR-configMappingIndex::=            INTEGER
(1..maxSchedReqPerCell)maxSchedReqPerCell INTEGER ::= 8 -- Maximum number
of simultaneous SR configurations per serving cell with
PUCCHSchedulingRequestConfig ::= SEQUENCE { sr-prohibitTimer ENUMERATED { u20, u40, u64,
u128, u512, u1024, u2560, spare1}, sr-TransMax ENUMERATED { n3, n4, n5, n6,
n7, n8, n10, n20, n50, n100, n200}sr-PUCCH-ResourceIndexINTEGER (0..2047),
sr-ConfigIndexINTEGER (0..157) }}
```

[Default SR Configuration Associated with Each LCH]

FIG. 4 illustrates a flow chart 400 of a BWP switching procedure according to one embodiment of the present disclosure.

The base station 140 may switch an active UL BWP, at 410. The base station 140 may deactivate the previously activated UL BWP and activate another UL BWP of configured UL BWPs. If there is no activated UL BWP, the base station 140 may activate an initial UL BWP or a default UL BWP without deactivating any UL BWP.

At 420, the base station 140 may encode BWP activation/deactivation information on a PDCCH. The BWP activation/deactivation information may indicate activation of a UP BWP of configured UL BWPs and/or deactivation of a previously activated UL BWP. In this disclosure, encoding of the BWP activation/deactivation information may include encoding downlink control information (DCI) to indicate or include the BWP activation/deactivation information on the PDCCH. Then, the base station 140 may transmit the PDCCH to the UE 110, at 430.

At 440, the UE 110 may receive and decode the PDCCH to obtain the BWP activation/deactivation information.

Further, the UE 110 may transmit UL data to the base station 140 within a bandwidth on the activated BWP.

In one embodiment with reference to FIG. 2, in accordance with the BWP switching at T2, the base station 140 may deactivate the BWP 202 and activate the BWP 204. The base station 140 may encode information, e.g., DCI, indicating deactivation of the BWP 202 and activation of the BWP 204 on a PDCCH and transmit the PDCCH to the UE 110. Upon reception of the PDCCH, the UE 110 may decode the PDCCH to identify deactivation of the BWP 202 and activation of BWP 204. Further, in accordance with the BWP switching at T3 in FIG. 2, the base station 140 may deactivate the BWP 204 and activate the BWP 206. The base station 140 may encode information, e.g., DCI, indicating deactivation of the BWP 204 and activation of the BWP 206 on a PDCCH and transmit the PDCCH to the UE 110. Upon reception of the PDCCH, the UE 110 may decode the PDCCH to identify deactivation of the BWP 204 and activation of BWP 206.

FIG. 5 illustrates a flow chart 500 of configuration and operations of a BWP inactivity timer according to one embodiment of the present disclosure.

The UE 110 can be configured with multiple BWP and only a specified number of BWP, e.g., one BWP, may be active at a time. The UE 110 may be also configured with an initial BWP, e.g., the BWP 202 in FIG. 2, which is the minimum required bandwidth. A default BWP may be same as the initial BWP. An activate BWP, e.g., the BWP 204 or 206 in FIG. 2, may be larger than the default BWP. An active BWP may be switched to the default BWP to save power in monitoring any DL or UL transmission indication such as the PDCCH transmitted by the base station 140. In addition, a BWP inactivity timer may also be used for this purpose or function.

At 510, the base station 140 may encode a set of parameters for at least one BWP inactivity timer in a RRC message. In one example, the parameters may be associated with the BWP inactivity timer per serving cell. In another example, the parameters may be associated with the BWP inactivity timer per MAC entity. The base station 140 may transmit the RRC message to the UE 110, at 520. Upon reception of the RRC message, the UE 110 may decode the RRC message to obtain the parameters for the BWP inactivity timer, at 530. At 540, the UE 110 may identify the BWP inactivity timer based on the parameters. In one example, the UE 110 may identify the BWP inactivity timer per serving cell. In another example, the UE 110 may identify the BWP inactivity timer per MAC entity. DRX operation may be defined per MAC entity. Similarly, a BWP inactivity timer may be defined per MAC entity. In this case, the UE 110 may monitor a PDCCH in multiple serving cells, e.g., a primary cell and a secondary cell, simultaneously.

The UE 110 may identify activation of a DL BWP of configured DL BWPs, at 550. In one example, the UE 110 may decode a PDCCH transmitted from the base station 140 to identify activation of the DL BWP. In another example, the UE 110 may identify activation of an initial BWP or a default BWP based on a RRC message from the base station 140. In further another example, the UE may identify activation of a default BWP based on expiration of the BWP inactivity timer. At 560, the UE 110 may detect a UL or DL transmission indication on the activated DL BWP. Upon detecting the UL or DL transmission indication, the UE 110 may start or restart the BWP inactivity timer, at 570. In one example, the UE 110 may start or restart the BWP inactivity timer when there is any DL or UL transmission indication on the activated DL BWP. In another example, the UE 110 may start or restart the BWP inactivity timer when there is only new DL or UL transmission indication on the activated DL BWP. The BWP inactivity timer may be stopped when the UE 110 switches from activated BWP to the default BWP.

The UE 110 may monitor the status of the BWP inactivity timer. The UE 110 may determine whether the BWP inactivity timer is expired, at 580. Upon the determination that the BWP inactivity timer is expired, the UE 110 may deactivate the DL BWP and activate the default DL BWP, at 590. With this mechanism, if the UE 110 is not scheduled for a certain amount of time, i.e., expiration of timer, the UE 110 switches its active DL BWP or DL/UL BWP pair to the default BWP. The BWP inactivity timer may switch to the default BWP without any signaling.

Multiple options for BWP inactivity timer running may be supported with regard to DRX timers. In one option, a BWP inactivity timer may run independent of DRX timers. In this option, as long as a BWP inactivity timer is running, the UE 110 does not switch to a default BWP autonomously. When the BWP inactivity timer expires, the UE 110 autonomously switches to default BWP. If the UE 110 wakes up from the DRX sleep and the BWP inactivity timer is still running, the UE 110 may monitor a PDCCH in an active BWP. If the UE 110 wakes up from the DRX sleep and the BWP inactivity timer is not running, the UE 110 may switch to a default BWP to monitor a PDCCH.

In another option, a BWP inactivity timer may run dependent on DRX timers. In this option, even the BWP inactivity timer expires, the UE 110 may not switch to a default BWP due to some of the DRX timers. If the BWP inactivity timer expired and any HARQ RTT timer or (UL)DRXretransmissionTimer is running, the UE 110 does not switch to a default BWP autonomously. If the BWP inactivity timer expired and no HARQ RTT timer or (UL)DRXretransmissionTimer is running, the UE 110 switches to a default BWP. If the BWP inactivity timer is still running after the UE 110 enters into DRX sleep and no DRX timer is running, the UE 110 switches to a default BWP to monitor a PDCCH in the next ON duration.

In another option, the BWP inactivity timer may be disabled. When the UE 110 wakes up from DRX sleep and if the UE 110 monitors on an active BWP, the UE 110 switched to default BWP to monitor the PDCCP in the DRX ON duration.

In embodiments, the UE 110 may perform BWP switching based on DRX operations. A Short DRX cycle may be configured together with a Long DRX cycle. A Short DRX cycle provides more flexibility for the tradeoff between latency and UE power consumption. In a case where Short DRX cycle is configured, if drxInactivityTimer expires or a DRX Command MAC CE is received, the MAC entity may use the Short DRX cycle. If the MAC entity uses Short DRX cycle, the MAC entity may switch to a default BWP. If the MAC entity uses Long DRX cycle, the MAC entity may switch to an active BWP before the onDurationTimer starts. Normally, Short DRX may be used to handle the trailing traffic burst and typically the probability of traffic arrival during Short DRX may not be high. It may be beneficial for the UE 110 to switch to a default BWP to save UE power consumption.

An exemplary change to NR specification 38.321 section 5.7 is shown below. Alternatively, the operation described above may be configured by RRC signaling.

TABLE 3

1> if drx-InactivityTimer expires or a DRX Command MAC CE is received: 2> if the Short DRX cycle is configured: 3> start or restart drx-ShortCycle; 3>switch to the default Bandwidth Part; 3> use the Short DRX Cycle. 2> else: 3> use the Long DRX cycle.

FIG. 6 illustrates a flow chart 600 for handling SR configurations in Carrier Aggregation (CA) according to one embodiment of the present disclosure.

The UE 110 may support one or more serving cells in CA scenario. A SR may be configured to one or more secondary cells, e.g., SCell, in addition to a primary cell, e.g., PCell. The UE 110 may use any PUCCH resource either in a primary cell or a secondary cell to transmit a SR. A secondary cell may also have PUCCH resource used for transmitting a SR.

At 610, the base station 140 may determine mapping information in CA. The primary cell may support multiple SR configurations, and the secondary cell may support one or more SR configurations. There may multiple options to handle the multiple SR configurations in CA. In one option, a LCH may be mapped to different SR configurations each belonging to different Cell, e.g., SpCell and SCells. In this option, if a LCH is mapped to SR configurations belonging to both SpCell and SCell, a SR associated with the LCH may be sent using the associated SR resources in SpCell or SCell whichever PUCCH resource comes first. In another example, the SR associated with a LCH may be always transmitted in all associated SR configurations belonging to all Cells.

The SR configurations belonging to different cells may carry the same or different information of the LCH. In one example, a LCH is mapped to two SR configurations one belonging to SpCell and the other to PUCCH SCell. The SR configuration belonging to SpCell implies the numerology or TTI of the LCH while the SR configuration belonging to PUCCH SCell implies the priority of the SCell. In another example, SR configurations each belonging to different Cells have same or different SR parameters such as SR periodicity.

In another option, a LCH may be mapped to zero or one SR configuration belonging to either SpCell or SCell. In this option, if a LCH is mapped to a SR configuration belonging to SCell, the LCH cannot be mapped to the SR configuration belonging to SpCell. The SR associated with the LCH needs to be transmitted via SCell. When the SCell is deactivated, the LCH may be immediately mapped to a SR configuration or new SR configuration belonging to another existing PUCCH SCell or SpCell.

A default SR configuration may be configured either in SpCell or one of the PUCCH SCells. If a SCell is deactivated, the LCH mapped to the SR configuration of the deactivated SCell may use the default SR configuration. Alternatively or additionally, similar to each SR configuration in SCell, a fallback SR configuration may be configured in SpCell or one of the PUCCH SCell. When a SCell is deactivated, the LCH mapped to the SR configuration of the deactivated SCell may use the corresponding the fallback SR configuration. The fallback SR configuration may be pre-configured when a SCell is added.

At 620, the base station 140 may transmit the mapping information. The UE 110 may obtain the mapping information. Multiple options, e.g., RRC signaling or MAC CE, may be used to configure SR resources in SCell. When a SCell is activated and a LCH is mapped to a new SR configuration in SCell, the LCH may be removed from the association with the SR configuration in PCell.

In one option, dedicated RRC signaling may be used to configure a SR configuration and its mapping to LCH for the SCell when SCell is added. When the SCell is activated, a new SR configuration may be configured for a LCH using the dedicated RRC signaling in the SCell. If the SCell is deactivated or released, corresponding SR configuration may be configured in another existing PUCCH SCell or PCell using the dedicated RRC signaling.

In another option, whenever a SCell is activated using a MAC CE, a new MAC CE in the same MAC PDU can be used to configure a new SR corresponding for the LCH. When a SCell is deactivated using a MAC CE, a new MAC CE in the same MAC PDU may be used to configure a corresponding SR configuration in the existing PUCCH SCell or PCell. Alternatively or additionally, a MAC CE may be used to change the mapping of LCH to SR configuration from PCell to SCell and vice versa. The MAC CE payload may include Cell identification and SR configuration index which maps to the SR parameters. FIGS. 16 and 17 illustrate MAC CE 1600 and 1700 that may be used according to one or more options discussed herein.

FIG. 16 illustrates a MAC CE 1600 that may be used to map or re-map a logical channel to a SR configuration in a cell. As shown by the MAC CE 1600, when field S is set to 0, A/R may be a bit indicative of addition or removal of a LCH to the corresponding SR configuration. The corresponding SR configuration is pre-configured and indicated by the sr-ConfigMappingIndex in the given cell identified by its ID. LCH ID is the logical channel identification.

FIG. 17 illustrates a MAC CE 1700 that may be used to add or remove a SR configuration from a cell. As shown by the MAC CE 1700, when field S is set to 1, A/R bit may be an indicator bit whether to add or remove a SR configuration. The SR configuration is pre-configured and identified by the index ID to a given cell identified by the Physical cell ID.

At 640, the UE 110 may identify activation of UL BWPs of the configured UL BWPs in multiple serving cells. The UE 110 may identify activation of a first UL BWP belonging to a first serving cell and activation of a second UL BWP belonging to a second serving cell. At 650, the UE 110 may encode an SR on a first PUCCH associated with a first SR configuration for the first UL BWP. Further, the UE 110 may encode the SR on a second PUCCH associated with a second SR configuration for the second UL BWP. The first SR configuration and the second SR configuration may be identified based on the mapping information at 630. The first SR configuration may be the same as the second SR configuration, but the disclosure is not limited to. Then, the UE 110 may transmit the first PUCCH and the second PUCCH to the base station 140 for corresponding serving cells. The UE 110 may utilize the first SR configuration in encoding the SR on the first PUCCH and/or transmitting the first PUCCH while utilizing second SR configuration in encoding the SR on the second PUCCH and/or transmitting the second PUCCH. At 670, the base station 140 may receive and decode the first PUCCH and the second PUCCH transmitted from the UE 110 to obtain the SR.

FIG. 7 illustrates a flow chart 700 for configuration and operations of a SR prohibit timer according to one embodiment of the present disclosure.

At 710, the base station 140 may encode a set of parameters for at least one SR prohibit timer in a RRC message. Each of the parameters may be associated with each of SR configurations. The base station 140 may transmit the RRC message to the UE 110, at 720. Upon reception of the RRC message, the UE 110 may decode the RRC message to obtain the parameters for the SR prohibit timer, at 730. At 740, the UE 110 may identify the SR prohibit timer based on the parameters. The UE 110 may identify the BWP inactivity timer per SR configuration based on the parameters. The UE 110 may determine whether to send a SR based on the SR prohibit timer, at 750. If the SR prohibit timer is running, the SR transmission may be delayed.

In some embodiments, drs-TransMax is independently configured per SR configuration. The SR-COUNTER is also configured per SR configuration. The SR_COUNTER may be configured per BWP, per LCH, per LCG, or per carrier. The value of the SR prohibit timer may be different for each SR configuration. Multiple options for timer running, e.g., single timer running or multiple timers running, may be supported.

In one option, a SR prohibit timer may be running per SR configuration. In this option, an independent SR prohibit timer may be started for each triggered SR belonging to different SR configurations.

In another option, a SR prohibit timer may be running per cell. In this option, one SR prohibit timer may be started for a group of SR configurations belonging to SpCell and another SR prohibit timer may be started for a group of SR configurations belonging to SCell. Within a cell, there may be multiple SR configurations. In one example, once the SR prohibit timer is triggered, no other SR may be transmitted in other SR configurations. In another example, highly prioritized SR or SR associated by a LCH having higher priority may be transmitted, and the SR prohibit timer is restarted.

In another option, only one SR prohibit timer may be running at a time. When a LCH/SR triggers the SR prohibit timer, SR belonging other SR configurations may not be transmitted until the SR prohibit timer is expired. In another example, if the SR prohibit timer was started associated with a LCH having lower priority or SR configuration of lower priority, highly prioritized SR or SR associated by a LCH having higher priority may be transmitted and the SR prohibit timer is restarted.

FIG. 8 illustrates an architecture of a system XS00 of a network in accordance with some embodiments. The system XS00 is shown to include a user equipment (UE) XS01 and a UE XS02. The UEs XS01 and XS02 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs XS01 and XS02 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs XS01 and XS02 may be configured to connect, e.g., communicatively couple, with a radio access network (RAN) XS10—the RAN XS10 may be, for example, an Evolved Universal Mobile Telecommunications System (UMTS) Terrestrial Radio Access Network (E-UTRAN), a NextGen RAN (NG RAN), or some other type of RAN. The UEs XS01 and XS02 utilize connections XS03 and XS04, respectively, each of which comprises a physical communications interface or layer (discussed in further detail below); in this example, the connections XS03 and XS04 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs XS01 and XS02 may further directly exchange communication data via a ProSe interface XS05. The ProSe interface XS05 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE XS02 is shown to be configured to access an access point (AP) XS06 via connection XS07. The connection XS07 can comprise a local wireless connection, such as a connection consistent with any IEEE 802.11 protocol, wherein the AP XS06 would comprise a wireless fidelity (WiFi®) router. In this example, the AP XS06 is shown to be connected to the Internet without connecting to the core network of the wireless system (described in further detail below).

The RAN XS10 can include one or more access nodes that enable the connections XS03 and XS04. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN XS10 may include one or more RAN nodes for providing macrocells, e.g., macro RAN node XS11, and one or more RAN nodes for providing femtocells or picocells (e.g., cells having smaller coverage areas, smaller user capacity, or higher bandwidth compared to macrocells), e.g., low power (LP) RAN node XS12.

Any of the RAN nodes XS11 and XS12 can terminate the air interface protocol and can be the first point of contact for the UEs XS01 and XS02. In some embodiments, any of the RAN nodes XS11 and XS12 can fulfill various logical functions for the RAN XS10 including, but not limited to, radio network controller (RNC) functions such as radio bearer management, uplink and downlink dynamic radio resource management and data packet scheduling, and mobility management.

In accordance with some embodiments, the UEs XS01 and XS02 can be configured to communicate using Orthogonal Frequency-Division Multiplexing (OFDM) communication signals with each other or with any of the RAN nodes XS11 and XS12 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes XS11 and XS12 to the UEs XS01 and XS02, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higherlayer signaling to the UEs XS01 and XS02. The physical downlink control channel (PDCCH) may carry information about the transport format and resource allocations related to the PDSCH channel, among other things. It may also inform the UEs XS01 and XS02 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes XS11 and XS12 based on channel quality information fed back from any of the UEs XS01 and XS02. The downlink resource assignment information may be sent on the PDCCH used for (e.g., assigned to) each of the UEs XS01 and XS02.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN XS10 is shown to be communicatively coupled to a core network (CN) XS20—via an S1 interface XS13. In embodiments, the CN XS20 may be an evolved packet core (EPC) network, a NextGen Packet Core (NPC) network, or some other type of CN. In this embodiment the S1 interface XS13 is split into two parts: the S1-U interface XS14, which carries traffic data between the RAN nodes XS11 and XS12 and the serving gateway (S-GW) XS22, and the S1-mobility management entity (MME) interface XS15, which is a signaling interface between the RAN nodes XS11 and XS12 and MMEs XS21.

In this embodiment, the CN XS20 comprises the MMEs XS21, the S-GW XS22, the Packet Data Network (PDN) Gateway (P-GW) XS23, and a home subscriber server (HSS) XS24. The MMEs XS21 may be similar in function to the control plane of legacy Serving General Packet Radio Service (GPRS) Support Nodes (SGSN). The MMEs XS21 may manage mobility aspects in access such as gateway selection and tracking area list management. The HSS XS24 may comprise a database for network users, including subscription-related information to support the network entities' handling of communication sessions. The CN XS20 may comprise one or several HSSs XS24, depending on the number of mobile subscribers, on the capacity of the equipment, on the organization of the network, etc. For example, the HSS XS24 can provide support for routing/roaming, authentication, authorization, naming/addressing resolution, location dependencies, etc.

The S-GW XS22 may terminate the S1 interface XS13 towards the RAN XS10, and routes data packets between the RAN XS10 and the CN XS20. In addition, the S-GW XS22 may be a local mobility anchor point for inter-RAN node handovers and also may provide an anchor for inter-3GPP mobility. Other responsibilities may include lawful intercept, charging, and some policy enforcement.

The P-GW XS23 may terminate an SGi interface toward a PDN. The P-GW XS23 may route data packets between the EPC network XS23 and external networks such as a network including the application server XS30 (alternatively referred to as application function (AF)) via an Internet Protocol (IP) interface XS25. Generally, the application server XS30 may be an element offering applications that use IP bearer resources with the core network (e.g., UMTS Packet Services (PS) domain, LTE PS data services, etc.). In this embodiment, the P-GW XS23 is shown to be communicatively coupled to an application server XS30 via an IP communications interface XS25. The application server XS30 can also be configured to support one or more communication services (e.g., Voice-over-Internet Protocol (VoIP) sessions, PTT sessions, group communication sessions, social networking services, etc.) for the UEs XS01 and XS02 via the CN XS20.

The P-GW XS23 may further be a node for policy enforcement and charging data collection. Policy and Charging Enforcement Function (PCRF) XS26 is the policy and charging control element of the CN XS20. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF XS26 may be communicatively coupled to the application server XS30 via the P-GW XS23. The application server XS30 may signal the PCRF XS26 to indicate a new service flow and select the appropriate Quality of Service (QoS) and charging parameters. The PCRF XS26 may provision this rule into a Policy and Charging Enforcement Function (PCEF) (not shown) with the appropriate traffic flow template (TFT) and QoS class of identifier (QCI), which commences the QoS and charging as specified by the application server XS30.

FIG. 9 illustrates example components of a device XT00 in accordance with some embodiments. In some embodiments, the device XT00 may include application circuitry XT02, baseband circuitry XT04, Radio Frequency (RF) circuitry XT06, frontend module (FEM) circuitry XT08, one or more antennas XT10, and power management circuitry (PMC) XT12 coupled together at least as shown. The components of the illustrated device XT00 may be included in a UE or a RAN node. In some embodiments, the device XT00 may include less elements (e.g., a RAN node may not utilize application circuitry XT02, and instead include a processor/controller to process IP data received from an EPC). In some embodiments, the device XT00 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry XT02 may include one or more application processors. For example, the application circuitry XT02 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device XT00. In some embodiments, processors of application circuitry XT02 may process IP data packets received from an EPC.

The baseband circuitry XT04 may include circuitry such as, but not limited to, one or more single-core or multi-core processors. The baseband circuitry XT04 may include one or more baseband processors or control logic to process baseband signals received from a receive signal path of the RF circuitry XT06 and to generate baseband signals for a transmit signal path of the RF circuitry XT06. Baseband processing circuitry XT04 may interface with the application circuitry XT02 for generation and processing of the baseband signals and for controlling operations of the RF circuitry XT06. For example, in some embodiments, the baseband circuitry XT04 may include a third generation (3G) baseband processor XT04A, a fourth generation (4G) baseband processor XT04B, a fifth generation (5G) baseband processor XT04C, or other baseband processor(s) XT04D for other existing generations, generations in development or to be developed in the future (e.g., second generation (2G), sixth generation (6G), etc.). The baseband circuitry XT04 (e.g., one or more of baseband processors XT04A-D) may handle various radio control functions that enable communication with one or more radio networks via the RF circuitry XT06. In other embodiments, some or all of the functionality of baseband processors XT04A-D may be included in modules stored in the memory XT04G and executed via a Central Processing Unit (CPU) XT04E. The radio control functions may include, but are not limited to, signal modulation/demodulation, encoding/decoding, radio frequency shifting, etc. In some embodiments, modulation/demodulation circuitry of the baseband circuitry XT04 may include Fast-Fourier Transform (FFT), preceding, or constellation mapping/demapping functionality. In some embodiments, encoding/decoding circuitry of the baseband circuitry XT04 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry XT04 may include one or more audio digital signal processor(s) (DSP) XT04F. The audio DSP(s) XT04F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry XT04 and the application circuitry XT02 may be implemented together such as, for example, on a system on a chip (SOC).

In some embodiments, the baseband circuitry XT04 may provide for communication compatible with one or more radio technologies. For example, in some embodiments, the baseband circuitry XT04 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry XT04 is configured to support radio communications of more than one wireless protocol may be referred to as multi-mode baseband circuitry.

RF circuitry XT06 may enable communication with wireless networks using modulated electromagnetic radiation through a non-solid medium. In various embodiments, the RF circuitry XT06 may include switches, filters, amplifiers, etc. to facilitate the communication with the wireless network. RF circuitry XT06 may include a receive signal path which may include circuitry to down-convert RF signals received from the FEM circuitry XT08 and provide baseband signals to the baseband circuitry XT04. RF circuitry XT06 may also include a transmit signal path which may include circuitry to up-convert baseband signals provided by the baseband circuitry XT04 and provide RF output signals to the FEM circuitry XT08 for transmission.

In some embodiments, the receive signal path of the RF circuitry XT06 may include mixer circuitry XT06*a*, amplifier circuitry XT06*b* and filter circuitry XT06*c*. In some embodiments, the transmit signal path of the RF circuitry XT06 may include filter circuitry XT06*c* and mixer circuitry XT06*a*. RF circuitry XT06 may also include synthesizer circuitry XT06*d* for synthesizing a frequency for use by the mixer circuitry XT06*a* of the receive signal path and the transmit signal path. In some embodiments, the mixer circuitry XT06*a* of the receive signal path may be configured to down-convert RF signals received from the FEM circuitry XT08 based on the synthesized frequency provided by synthesizer circuitry XT06*d*. The amplifier circuitry XT06*b* may be configured to amplify the down-converted signals and the filter circuitry XT06*c* may be a low-pass filter (LPF) or band-pass filter (BPF) configured to remove unwanted signals from the down-converted signals to generate output baseband signals. Output baseband signals may be provided to the baseband circuitry XT04 for further processing. In some embodiments, the output baseband signals may be zerofrequency baseband signals, although this is not a requirement. In some embodiments, mixer circuitry XT06*a* of the receive signal path may comprise passive mixers, although the scope of the embodiments is not limited in this respect.

In some embodiments, the mixer circuitry XT06*a* of the transmit signal path may be configured to up-convert input baseband signals based on the synthesized frequency provided by the synthesizer circuitry XT06*d* to generate RF output signals for the FEM circuitry XT08. The baseband signals may be provided by the baseband circuitry XT04 and may be filtered by filter circuitry XT06*c*.

In some embodiments, the mixer circuitry XT06a of the receive signal path and the mixer circuitry XT06a of the transmit signal path may include two or more mixers and may be arranged for quadrature downconversion and upconversion, respectively. In some embodiments, the mixer circuitry XT06a of the receive signal path and the mixer circuitry XT06a of the transmit signal path may include two or more mixers and may be arranged for image rejection (e.g., Hartley image rejection). In some embodiments, the mixer circuitry XT06a of the receive signal path and the mixer circuitry XT06a may be arranged for direct downconversion and direct upconversion, respectively. In some embodiments, the mixer circuitry XT06a of the receive signal path and the mixer circuitry XT06a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry XT06 may include analog-to-digital converter (ADC) and digital-to-analog converter (DAC) circuitry and the baseband circuitry XT04 may include a digital baseband interface to communicate with the RF circuitry XT06.

In some dual-mode embodiments, a separate radio IC circuitry may be provided for processing signals for each spectrum, although the scope of the embodiments is not limited in this respect.

In some embodiments, the synthesizer circuitry XT06d may be a fractional-N synthesizer or a fractional N/N+1 synthesizer, although the scope of the embodiments is not limited in this respect as other types of frequency synthesizers may be suitable. For example, synthesizer circuitry XT06d may be a delta-sigma synthesizer, a frequency multiplier, or a synthesizer comprising a phase-locked loop with a frequency divider.

The synthesizer circuitry XT06d may be configured to synthesize an output frequency for use by the mixer circuitry XT06a of the RF circuitry XT06 based on a frequency input and a divider control input. In some embodiments, the synthesizer circuitry XT06d may be a fractional N/N+1 synthesizer.

In some embodiments, frequency input may be provided by a voltage controlled oscillator (VCO), although that is not a requirement. Divider control input may be provided by either the baseband circuitry XT04 or the applications processor XT02 depending on the desired output frequency. In some embodiments, a divider control input (e.g., N) may be determined from a look-up table based on a channel indicated by the applications processor XT02.

Synthesizer circuitry XT06d of the RF circuitry XT06 may include a divider, a delaylocked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flipflop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry XT06d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry XT06 may include an IQ/polar converter.

FEM circuitry XT08 may include a receive signal path which may include circuitry configured to operate on RF signals received from one or more antennas XT10, amplify the received signals and provide the amplified versions of the received signals to the RF circuitry XT06 for further processing. FEM circuitry XT08 may also include a transmit signal path which may include circuitry configured to amplify signals for transmission provided by the RF circuitry XT06 for transmission by one or more of the one or more antennas XT10. In various embodiments, the amplification through the transmit or receive signal paths may be done solely in the RF circuitry XT06, solely in the FEM XT08, or in both the RF circuitry XT06 and the FEM XT08.

In some embodiments, the FEM circuitry XT08 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry XT06). The transmit signal path of the FEM circuitry XT08 may include a power amplifier (PA) to amplify input RF signals (e.g., provided by RF circuitry XT06), and one or more filters to generate RF signals for subsequent transmission (e.g., by one or more of the one or more antennas XT10).

In some embodiments, the PMC XT12 may manage power provided to the baseband circuitry XT04. In particular, the PMC XT12 may control power-source selection, voltage scaling, battery charging, or DC-to-DC conversion. The PMC XT12 may often be included when the device XT00 is capable of being powered by a battery, for example, when the device is included in a UE. The PMC XT12 may increase the power conversion efficiency while providing desirable implementation size and heat dissipation characteristics.

While FIG. 9 shows the PMC XT12 coupled only with the baseband circuitry XT04. However, in other embodiments, the PMC XT12 may be additionally or alternatively coupled with, and perform similar power management operations for, other components such as, but not limited to, application circuitry XT02, RF circuitry XT06, or FEM XT08.

In some embodiments, the PMC XT12 may control, or otherwise be part of, various power saving mechanisms of the device XT00. For example, if the device XT00 is in an RRC_Connected state, where it is still connected to the RAN node as it expects to receive traffic shortly, then it may enter a state known as Discontinuous Reception Mode (DRX) after a period of inactivity. During this state, the device XT00 may power down for brief intervals of time and thus save power.

If there is no data traffic activity for an extended period of time, then the device XT00 may transition off to an RRC_Idle state, where it disconnects from the network and does not perform operations such as channel quality feedback, handover, etc. The device XT00 goes into a very low power state and it performs paging where again it periodically wakes up to listen to the network and then powers down again. The device XT00 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry XT02 and processors of the baseband circuitry XT04 may be used to execute elements of one or more instances of a protocol stack. For example, processors of the baseband circuitry XT04, alone or in combination, may be used execute Layer 3, Layer 2, or Layer 1 functionality, while processors of the application circuitry XT04 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

FIG. 10 illustrates example interfaces of baseband circuitry in accordance with some embodiments. As discussed above, the baseband circuitry XT04 of FIG. 9 may comprise processors XT04A-XT04E and a memory XT04G utilized by said processors. Each of the processors XT04A-XT04E may include a memory interface, XU04A-XU04E, respectively, to send/receive data to/from the memory XT04G.

The baseband circuitry XT04 may further include one or more interfaces to communicatively couple to other circuitries/devices, such as a memory interface XU12 (e.g., an interface to send/receive data to/from memory external to the baseband circuitry XT04), an application circuitry interface XU14 (e.g., an interface to send/receive data to/from the application circuitry XT02 of FIG. 9), an RF circuitry interface XU16 (e.g., an interface to send/receive data to/from RF circuitry XT06 of FIG. 9), a wireless hardware connectivity interface XU18 (e.g., an interface to send/receive data to/from Near Field Communication (NFC) components, Bluetooth® components (e.g., Bluetooth® Low Energy), Wi-Fi® components, and other communication components), and a power management interface XU20 (e.g., an interface to send/receive power or control signals to/from the PMC XT12).

FIG. 11 is an illustration of a control plane protocol stack in accordance with some embodiments. In this embodiment, a control plane XV00 is shown as a communications protocol stack between the UE XS01 (or alternatively, the UE XS02), the RAN node XS11 (or alternatively, the RAN node XS12), and the MME XS21.

The PHY layer XV01 may transmit or receive information used by the MAC layer XV02 over one or more air interfaces. The PHY layer XV01 may further perform link adaptation or adaptive modulation and coding (AMC), power control, cell search (e.g., for initial synchronization and handover purposes), and other measurements used by higher layers, such as the RRC layer XV05. The PHY layer XV01 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer XV02 may perform mapping between logical channels and transport channels, multiplexing of MAC service data units (SDUs) from one or more logical channels onto transport blocks (TB) to be delivered to PHY via transport channels, demultiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

The RLC layer XV03 may operate in a plurality of modes of operation, including: Transparent Mode (TM), Unacknowledged Mode (UM), and Acknowledged Mode (AM). The RLC layer XV03 may execute transfer of upper layer protocol data units (PDUs), error correction through automatic repeat request (ARQ) for AM data transfers, and concatenation, segmentation and reassembly of RLC SDUs for UM and AM data transfers. The RLC layer XV03 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer XV04 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer XV05 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE XS01 and the RAN node XS11 may utilize a Uu interface (e.g., an LTE-Uu interface) to exchange control plane data via a protocol stack comprising the PHY layer XV01, the MAC layer XV02, the RLC layer XV03, the PDCP layer XV04, and the RRC layer XV05.

The non-access stratum (NAS) protocols XV06 form the highest stratum of the control plane between the UE XS01 and the MME XS21. The NAS protocols XV06 support the mobility of the UE XS01 and the session management procedures to establish and maintain IP connectivity between the UE XS01 and the P-GW XS23.

The S1 Application Protocol (S1-AP) layer XV15 may support the functions of the S1 interface and comprise Elementary Procedures (EPs). An EP is a unit of interaction between the RAN node XS11 and the CN XS20. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) XV14 may ensure reliable delivery of signaling messages between the RAN node XS11 and the MME XS21 based, in part, on the IP protocol, supported by the IP layer XV13. The L2 layer XV12 and the L1 layer XV11 may refer to communication links (e.g., wired or wireless) used by the RAN node and the MME to exchange information.

The RAN node XS11 and the MME XS21 may utilize an S1-MME interface to exchange control plane data via a protocol stack comprising the L1 layer XV11, the L2 layer XV12, the IP layer XV13, the SCTP layer XV14, and the S1-AP layer XV15.

FIG. 12 is an illustration of a user plane protocol stack in accordance with some embodiments. In this embodiment, a user plane XW00 is shown as a communications protocol stack between the UE XS01 (or alternatively, the UE XS02), the RAN node XS11 (or alternatively, the RAN node XS12), the S-GW XS22, and the P-GW XS23. The user plane XW00 may utilize at least some of the same protocol layers as the control plane XV00. For example, the UE XS01 and the RAN node XS11 may utilize a Uu interface (e.g., an LTE-Uu interface) to exchange user plane data via a protocol stack comprising the PHY layer XV01, the MAC layer XV02, the RLC layer XV03, the PDCP layer XV04.

The General Packet Radio Service (GPRS) Tunneling Protocol for the user plane (GTP-U) layer XW04 may be used for carrying user data within the GPRS core network and between the radio access network and the core network. The user data transported can be packets in any of IPv4, IPv6, or PPP formats, for example. The UDP and IP security (UDP/IP) layer XW03 may provide checksums for data integrity, port numbers for addressing different functions at the source and destination, and encryption and authentication on the selected data flows. The RAN node XS11 and the S-GW XS22 may utilize an S1-U interface to exchange user plane data via a protocol stack comprising the L1 layer XV11, the L2 layer XV12, the UDP/IP layer XW03, and the GTP-U layer XW04. The S-GW XS22 and the P-GW XS23 may utilize an S5/S8a interface to exchange user plane data via a protocol stack comprising the L1 layer XV11, the L2 layer XV12, the UDP/IP layer XW03, and the GTP-U layer XW04. As discussed above with respect to FIG. 11, NAS protocols support the mobility of the UE XS01 and the session management procedures to establish and maintain IP connectivity between the UE XS01 and the P-GW XS23.

FIG. 13 illustrates components of a core network in accordance with some embodiments. The components of the CN XS20 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN XS20 may be referred to as a network slice XX01. A logical instantiation of a portion of the CN XS20 may be referred to as a network sub-slice XX02 (e.g., the network sub-slice XX02 is shown to include the PGW XS23 and the PCRF XS26).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

FIG. 14 is a block diagram illustrating components, according to some example embodiments, of a system XY00 to support NFV. The system XY00 is illustrated as including a virtualized infrastructure manager (VIM) XY02, a network function virtualization infrastructure (NFVI) XY04, a VNF manager (VNFM) XY06, virtualized network functions (VNFs) XY08, an element manager (EM) XY10, an NFV Orchestrator (NFVO) XY12, and a network manager (NM) XY14.

The VIM XY02 manages the resources of the NFVI XY04. The NFVI XY04 can include physical or virtual resources and applications (including hypervisors) used to execute the system XY00. The VIM XY02 may manage the life cycle of virtual resources with the NFVI XY04 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM XY06 may manage the VNFs XY08. The VNFs XY08 may be used to execute EPC components/functions. The VNFM XY06 may manage the life cycle of the VNFs XY08 and track performance, fault and security of the virtual aspects of VNFs XY08. The EM XY10 may track the performance, fault and security of the functional aspects of VNFs XY08. The tracking data from the VNFM XY06 and the EM XY10 may comprise, for example, performance measurement (PM) data used by the VIM XY02 or the NFVI XY04. Both the VNFM XY06 and the EM XY10 can scale up/down the quantity of VNFs of the system XY00.

The NFVO XY12 may coordinate, authorize, release and engage resources of the NFVI XY04 in order to provide the requested service (e.g., to execute an EPC function, component, or slice). The NM XY14 may provide a package of end-user functions with the responsibility for the management of a network, which may include network elements with VNFs, non-virtualized network functions, or both (management of the VNFs may occur via the EM XY10).

FIG. 15 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 15 shows a diagrammatic representation of hardware resources XZ00 including one or more processors (or processor cores) XZ10, one or more memory/storage devices XZ20, and one or more communication resources XZ30, each of which may be communicatively coupled via a bus XZ40. For embodiments where node virtualization (e.g., NFV) is utilized, a hypervisor XZ02 may be executed to provide an execution environment for one or more network slices/sub-slices to utilize the hardware resources XZ00

The processors XZ10 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor XZ12 and a processor XZ14.

The memory/storage devices XZ20 may include main memory, disk storage, or any suitable combination thereof. The memory/storage devices XZ20 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources XZ30 may include interconnection or network interface components or other suitable devices to communicate with one or more peripheral devices XZ04 or one or more databases XZ06 via a network XZ08. For example, the communication resources XZ30 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions XZ50 may comprise software, a program, an application, an applet, an app, or other executable code for causing at least any of the processors XZ10 to perform any one or more of the methodologies discussed herein. The instructions XZ50 may reside, completely or partially, within at least one of the processors XZ10 (e.g., within the processor's cache memory), the memory/storage devices XZ20, or any suitable combination thereof. Furthermore, any portion of the instructions XZ50 may be transferred to the hardware resources XZ00 from any combination of the peripheral devices XZ04 or the databases XZ06. Accordingly, the memory of processors XZ10, the memory/storage devices XZ20, the peripheral devices XZ04, and the databases XZ06 are examples of computer-readable and machine-readable media.

EXAMPLES

Example 1 may include a method of using a bandwidth part ("BWP") inactivity timer for BWP switching.

Example 2 may include the method of the example 1 or some other example herein, where the said BWP inactivity timer is defined per cell.

Example 3 may include the method of the example 1 or some other example herein, where the said BWP inactivity timer is defined per MAC entity.

Example 4 may include the method of example 1 or some other example herein, where the BWP switching is in DL BWP, UL BWP, or both DL and UL BWP.

Example 5 may include the method of example 1 or some other example herein, where a starting/restarting condition for the BWP inactivity timer is when there is only new DL or UL transmission indication in PDCCH.

Example 6 may include the method of example 1 or some other example herein, where a starting/restarting condition for the said BWP inactivity timer is when there is any DL or UL transmission indication in PDCCH.

Example 7 may include the method of example 1 or some other example herein, where the BWP inactivity timer is stopped when the UE switches from an active BWP to a default BWP.

Example 8 may include the method of example 1 or some other example herein, where the BWP inactivity timer is configured by dedicated RRC signaling.

Example 9 may include the method where the BWP inactivity timer and DRX timers work together.

Example 10 may include the method of example 9 or some other example herein, where UE switches from the active BWP to default BWP when the BWP inactivity timer is expired and no HARQ RTT and UL/DL DRX retransmission timers are running.

Example 11 may include the method of example 9 or some other example herein, where a UE switches from the active BWP to default BWP when no DRX timers are running and UE enters into the DRX sleep.

Example 12 may include the method of configuring multiple SR configurations for each configured UL BWP in each serving cell.

Example 13 may include the method of example 12 or some other example herein, where the SR configurations in different UL BWP imply the same or different (e.g., numerology/TTI or priority) of the LCHs.

Example 14 may include the method of example 12 or some other example herein, where the mapping policy of the LCHs to SR configuration can be different for different UL BWPs.

Example 15 may include the method of example 12 or some other example herein, where the SR configurations that imply same information of LCHs in different UL BWP could have different SR parameters (e.g., SR periodicity, SR retransmission limit).

Example 16 may include a method where an eNB monitors both default UL BWP and active UL BWP simultaneously for any UL data transmission.

Example 17 may include the method of example 16 or some other example herein, where UE switches to the default or active UL BWP where a LCH which triggered the SR has mapped SR configuration.

Example 18 may include the method of example 16 or some other example herein, where a default BWP can be configured with default SR configuration(s) which is (are) used if the LCH is not mapped to any other SR configurations or nor SR resource is available in the active UL BWP in SpCell or SCell.

Example 19 may include the method where multiple UL BWPs are active at a time.

Example 20 may include the method of example 19 or some other example herein, where a LCH is mapped to multiple SR configurations or single SR configuration belonging to different active UL BWP implying different information (numerology/TTI or priority) of the LCH.

Example 21 may include the method of example 19 or some other example herein, where a LCH is mapped to multiple SR configurations each belonging to different BWP and each having different SR periodicity.

Example 22 may include the method where a UL BWP is configured with one or more than one default SR configuration.

Example 23 may include the method of example 22 or some other example herein, where a LCH which has no resource in an active UL BWP or the SR triggered by the LCH is failed or unsuccessful or the active UL BWP is deactivated, the UE can use the default SR configuration in that UL BWP to transmit the SR.

Example 24 may include the method where a UE supports CA and none or one or more than one SR configurations are configured for each SpCell and SCells.

Example 25 may include the method of example 24 or some other example herein, where a LCH is mapped to none or one SR configuration belonging to either the SpCell or SCell.

Example 26 may include the method of example 25 or some other example herein, where If a SCell is deactivated, the LCH is immediately mapped to an existing SR configuration or a new SR configuration in another PUCCH SCell or SpCell using MAC CE or dedicated RRC signaling.

Example 27 may include the method of example 25 or some other example herein, where one or more default SR configurations are configured either in SpCell or PUCCH SCell to be used by the LCH if it has no mapped SR configuration or the SCell with mapped SR configuration is deactivated.

Example 28 may include the method of example 25 or some other example herein, where a fallback SR configuration is pre-configured in SpCell or one of the PUCCH SCell for each LCH which has a mapped SR configuration.

Example 29 may include the method of example 28 or some other example herein, where the fallback SR configuration is used if the SR triggered by a LCH has no SR resource due to the de-activation of the SCell.

Example 30 may include the method of example 24 or some other example herein, where a LCH is mapped to more than one SR configurations each belonging to different cells.

Example 31 may include the method of example 30 or some other example herein, where the SR configurations belonging to different cells imply the same or different information (e.g., numerology/TTI or priority) of the LCH.

Example 32 may include the method of example 30 or some other example herein, where SR configurations each belonging to different Cells have same or different SR parameters such as SR periodicity and SR retransmission limit.

Example 33 may include the method where SR prohibit timer is configured per cell.

Example 34 may include the method of example 33 or some other example herein, where a single or multiple SR prohibit timers can run at a time.

Example 35 may include the method of example 33 or some other example herein, where a higher priority SR or SR triggered by the higher priority LCH can transmit the SR and start it's SR prohibit timer while stopping the currently running SR prohibit timer.

Example 36 may include the method of example 35 or some other example herein, which is also applicable when SR prohibit timer is configure per SR configuration.

Example 37 may include the method where the MAC CE command to configure or map or remap the SR configuration to a LCH is transmitted in the same PDU where the MAC CE command to activate or deactivate the SCell is transmitted.

Example 38 may include the method where the MAC entity switches to default BWP if the MAC entity uses Short DRX cycle and the MAC entity switches to active BWP before the onDurationTimer starts if the MAC entity uses Long DRX cycle.

Example 39 may include the method where a new LCID is defined to indicate the truncated variable BSR which reports buffer status of x logical channel groups and provides indication that more than x logical channel groups have data to transmit.

Example 40 may include an apparatus comprising means to perform one or more elements of a method described in or related to any of examples 1-39, or any other method or process described herein.

Example 41 may include one or more non-transitory computer-readable media comprising instructions to cause an electronic device, upon execution of the instructions by one or more processors of the electronic device, to perform one or more elements of a method described in or related to any of examples 1-39, or any other method or process described herein.

Example 42 may include an apparatus comprising logic, modules, or circuitry to perform one or more elements of a method described in or related to any of examples 1-39, or any other method or process described herein.

Example 43 may include a method, technique, or process as described in or related to any of examples 1-39, or portions or parts thereof.

Example 44 may include an apparatus comprising: one or more processors and one or more computer readable media comprising instructions that, when executed by the one or more processors, cause the one or more processors to perform the method, techniques, or process as described in or related to any of examples 1-39, or portions thereof.

Example 45 may include a signal as described in or related to any of examples 1-39, or portions or parts thereof.

Example 46 may include a signal in a wireless network as shown and described herein.

Example 47 may include a method of communicating in a wireless network as shown and described herein.

Example 48 may include a system for providing wireless communication as shown and described herein.

Example 49 may include a device for providing wireless communication as shown and described herein.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The invention claimed is:

1. An apparatus to be used in a user equipment (UE) in a mobile communication network to communicate with a base station, comprising:
a memory configured to store a Radio Resource Control (RRC) message; and
processing circuitry configured to:
decode the RRC message to obtain bandwidth part (BWP) configuration information and mapping information;
identify one or more uplink (UL) BWPs and one or more downlink (DL) BWPs within a carrier bandwidth per Serving Cell based on the BWP configuration information;
identify one or more scheduling request (SR) configurations which a logical channel (LCH) is mapped to for the UL BWPs based on the mapping information, the LCH being mapped to none or one SR configuration for each of the UL BWPs;
identify activation of a UL BWP of the UL BWPs;
encode an SR on a Physical Uplink Control Channel (PUCCH) based on a SR configuration for the UL BWP;
identify a first SR configuration which the LCH is mapped to for a first UL BWP belonging to a first Serving Cell;

identify a second SR configuration which the LCH is mapped to for a second UL BWP belong to a second Serving Cell;

encode the SR on a first PUCCH associated with the first SR configuration for the first UL BWP; and encode the SR on a second PUCCH associated with the second SR configuration for the second UL BWP.

2. The apparatus of claim 1, wherein the circuitry is further configured to:

decode a first Physical Downlink Control Channel (PDCCH) to obtain first BWP activation/deactivation information; and identify activation of a first UL BWP of the UL BWPs based on the first BWP activation/deactivation information.

3. The apparatus of claim 2, wherein the circuitry is further configured to:

decode a second PDCCH to obtain second BWP activation/deactivation information; and identify deactivation of the first UL BWP and activation of a second UL BWP of the UL BWPs.

4. The apparatus of claim 1, wherein the circuitry is further configured to:

decode the message to obtain a set of parameters for at least one BWP inactivity timer; and identify the timer per Serving Cell based on the parameters.

5. The apparatus of claim 4, wherein the circuitry is further configured to:

decode a PDCCH to identify activation of a DL BWP of the DL BWPs; detect a UL or DL transmission indication on the DL BWP; and start or restart the timer upon detecting the UL or DL transmission indication.

6. The apparatus of claim 4, wherein the circuitry is further configured to:

decode a PDCCH to identify activation of a DL BWP of the DL BWPs; determine whether the timer is expired; and deactivate the DL BWP and activate a default DL BWP of the DL BWPs upon the determination that the timer is expired.

7. The apparatus of claim 1, wherein the first SR configuration is the same as the second SR configuration.

8. The apparatus of claim 1, wherein the circuitry is further configured to:

decode the message to obtain a set of parameters for at least one SR prohibit timer, each of the parameters being associated with each of the SR configurations; and identify the timer per SR configuration based on the parameters.

9. The apparatus of claim 8, wherein the circuitry is further configured to identify a first SR prohibit timer for a first SR configuration and a second SR prohibit timer for a second SR configuration, and wherein the first SR prohibit timer runs independently of the second SR prohibit timer.

10. The apparatus of claim 1, wherein the circuitry is further configured to encode a buffer status reporting (BSR) on a Physical Uplink Shared Channel (PUSCH), and wherein the BSR includes a Logical Channel ID (LCID) field indicative of a variable truncated BSR.

11. The apparatus of claim 1, wherein the SR configurations are associated with at least one among a group consisting of a numerology, a transmission time interval (TTI), and a priority of the LCH.

12. The apparatus of claim 1, wherein the circuitry is configured to cause the PUCCH to be transmitted to the base station using the SR configuration.

13. An apparatus to be used in a base station in a mobile communication network to communicate with a UE, comprising:

a memory configured to store at least one of BWP configuration information or mapping information; and processing circuitry configured to:

encode the BWP configuration information associated with one or more UL BWPs and one or more DL BWPs within a carrier bandwidth per Serving Cell in a RRC message;

encode the mapping information indicative of a correlation between an LCH and one or more SR configurations for the UL BWPs in the message, wherein the mapping information is indicative of a first SR configuration which the LCH is mapped to for a first UL BWP belonging to a first Serving Cell, and wherein the mapping information is indicative of a second SR configuration which the LCH is mapped to for a second UL BWP belonging to a second Serving Cell;

encode BWP activation/deactivation information indicating activation of a UL BWP of the UL BWPs;

decode a PUCCH to obtain an SR, the PUCCH being associated with a SR configuration for the UL BWP;

decode a first PUCCH associated with the first SR configuration for the first UL BWP to obtain the SR; and decode a second PUCCH associated with the second SR configuration for the second UL BWP to obtain the SR.

14. The apparatus of claim 13, wherein the circuitry is further configured to encode first BWP activation/deactivation information on a first PDCCH, the BWP activation/deactivation information indicating activation of a first UL BWP of the UL BWPs.

15. The apparatus of claim 14, wherein the circuitry is further configured to encode second BWP activation/deactivation information on a second PDCCH, the second BWP activation/deactivation information indicating deactivation of the first UL BWP and activation of a second UL BWP of the UL BWPs.

16. The apparatus of claim 13, wherein the circuitry is further configured to encode a set of parameters for at least one BWP inactivity timer in the message, the parameters being associated with the timer per Serving Cell.

17. The apparatus of claim 13, wherein the first SR configuration is the same as the second SR configuration.

18. The apparatus of claim 13, wherein the circuitry is further configured to encode a set of parameters for at least one SR prohibit timer in the message, and wherein each of the parameters being associated with each of the SR configurations.

19. The apparatus of claim 13, wherein the circuitry is further configured to decode a PUSCH to obtain a BSR, and wherein the BSR includes an LCID field indicative of a variable truncated BSR.

20. The apparatus of claim 13, wherein the SR configurations are associated with at least one among a group consisting of a numerology, a TTI, and a priority of the LCH.

21. The apparatus of claim 13, wherein the circuitry is configured to cause the message to be transmitted to the UE.

* * * * *